(12) United States Patent
Koike

(10) Patent No.: US 7,050,205 B2
(45) Date of Patent: May 23, 2006

(54) METHOD OF CORRECTING IMAGE DATA PICKED UP FROM PHOTOGRAPHIC FILM

(75) Inventor: Kazumi Koike, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 862 days.

(21) Appl. No.: 10/025,467

(22) Filed: Dec. 26, 2001

(65) Prior Publication Data

US 2002/0131095 A1   Sep. 19, 2002

(30) Foreign Application Priority Data

Dec. 26, 2000  (JP)  ............... 2000-395474
Dec. 27, 2000  (JP)  ............... 2000-396701

(51) Int. Cl.
*H04M 2/04*  (2006.01)

(52) U.S. Cl. ............ 358/474; 358/1.2; 358/3.26; 382/284; 348/345

(58) Field of Classification Search ........ 358/474, 358/1.2, 3.26, 516, 518, 521, 525, 527, 406; 382/284; 348/345; 345/173
See application file for complete search history.

(56) References Cited

U.S. PATENT DOCUMENTS

| | | | | |
|---|---|---|---|---|
| 6,011,636 A * | 1/2000 | Tanaka et al. | ............... | 358/527 |
| 6,281,931 B1 * | 8/2001 | Tsao et al. | ............... | 348/247 |
| 6,850,340 B1 * | 2/2005 | Ohshita | ............... | 358/1.2 |
| 6,853,400 B1 * | 2/2005 | Matama | ............... | 348/96 |
| 2001/0038755 A1 * | 11/2001 | Ishihara et al. | ............... | 396/321 |
| 2002/0033975 A1 * | 3/2002 | Yamazaki | ............... | 358/515 |
| 2003/0059198 A1 * | 3/2003 | Yagura et al. | ............... | 386/46 |

FOREIGN PATENT DOCUMENTS

| | | |
|---|---|---|
| JP | 11-313214 | 11/1999 |
| JP | 2000-125174 | 4/2000 |

* cited by examiner

*Primary Examiner*—Kimberly A. Williams
*Assistant Examiner*—Negussie Worku
(74) *Attorney, Agent, or Firm*—Young & Thompson

(57) ABSTRACT

There is disclosed an image data correction method for correcting image data picked up from an original image photographed in an exposure frame on a photographic film through a taking lens while holding the exposure frame curved along a lengthwise direction of the exposure frame to be concave toward the taking lens, so as to eliminate image distortion in the original image. An actual location of each pixel of the original image is calculated on the basis of an ideal location that corresponds to an ideal image point of that pixel formed on a flat exposure frame through an ideal taking lens having no distortion, and correction parameters predetermined in accordance with the distortion of the taking lens and the curvature of the exposure frame at the exposure. Then, the image data are rearranging by transforming each pixel from its actual location to its ideal location in accordance with a correlation between actual locations and ideal locations of respective pixels of the original image.

13 Claims, 16 Drawing Sheets

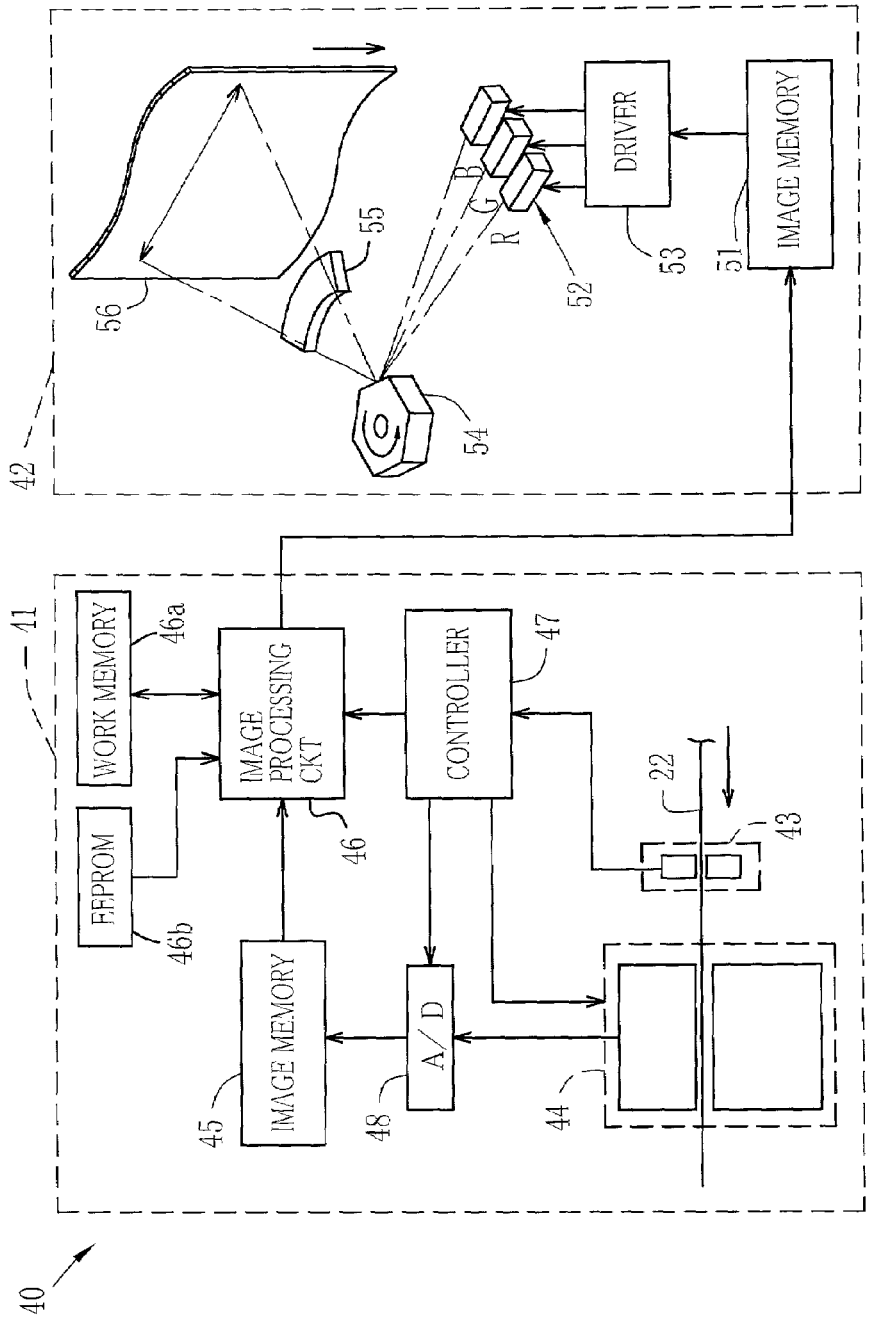

METHOD OF CORRECTING IMAGE DATA PICKED UP FROM PHOTOGRAPHIC FILM

BACKGROUND OF THE INVENTION

1. Field of the Invention

The present invention relates to a method of correcting image data picked up from pictures photographed on photographic film, especially those photographed by lens-fitted photographic film units or compact cameras, for printing pictures with improved quality on the basis of the corrected image data.

2. Background Arts

As a photographic device for taking pictures on a photographic film, the lens-fitted photo film units have been known these days besides cameras, including single-reflection cameras and compact cameras. The lens-fitted photo film unit, hereinafter called the film unit, is widely used in the world because of its handiness: it contains a roll of unexposed photographic film in a unit body having photographic mechanisms, including a taking lens and a shutter mechanism, incorporated thereinto, to permit enjoying photography quickly on the spot as it is purchased, and the user has only to forward the film unit after photography to an agency of a photofinisher. Since another advantage of the film unit is that it is purchased at a low price, the manufacturing cost should be as low as possible, so the structure must be simple, and the components must be inexpensive.

For this reason, the taking lens mounted to the above described film unit is usually composed of a single or a couple of plastic lenses. Since the taking lens is composed of a single or a couple of lenses, it is difficult to improve the performances of the taking lens so as to correct aberrations sufficiently for obtaining adequate image quality. For this reason, in the conventional film unit, in order to compensate for the curvature of field of the taking lens, one of the factors that worsens the image quality, the photographic film is held behind an exposure aperture of the film unit, with its surface curved along its lengthwise direction, so that an optical image formed through the taking lens on the curved film surface may be in focus in the entire exposure frame.

As another typical factor of worsening the image quality, distortion of the taking lens may be cited. The distortion is resulted from changes in image magnification with the distance between the exit pupil of the taking lens to the image surface that is equal to the film surface to be exposed.

The distortion and other aberrations can be well eliminated by using an accurate taking lens that is composed of a certain number of expensive lens elements, like those used in single-lens reflex cameras. However, such an expensive taking lens is not applicable to the lens-fitted photo film units and the compact cameras since they need to be manufactured at a low cost. Thus, the pictures photographed by the film unit or the compact camera cannot avoid being affected by the lens distortion.

To solve this problem, teaching to pick up image data from the photographed pictures and correct the image data so as to eliminate the influence of the aberrations of the taking lens has been disclosed for example in JPA Nos. 11-313214 and 2000-125174. Based on the corrected image data, a high quality image may be reproduced.

Specifically, according to the image processing method disclosed in JPA 11-313214, the original image recorded on photographic film or the like is optically read out through a scanner to pick up original image data, and the original image data is processed to correct the distortion of the original image in accordance with lens data of the taking lens used for photographing the original image. In the image processing, coordinate values assigned to the original image data are transformed by use of correction formulas and correction coefficients for the correction formulas which are predetermined in accordance with the lens data, and the image data is rearranged according to the transformed coordinates. In JPA 2000-125174, the image processing for correcting the image distortion is executed by use of a correction formula that represents an index of distortion $f(L)=(L'-L)/L'$, wherein L represents a distance from the optical axis, and L' represents a distance varied from the distance L due to the distortion.

However, JPA 11-313214 does not concretely disclose the correction formula for the image processing, but just discloses that the correction formula is predetermined according to the lens data. If the correction formula is complicated, it will take enormous time for the calculation or operation. Thus, the image processing method using such a complicated correction formula is not applicable to a digital printer for the film units that is required to process and print a large number of images at a high speed.

The image processing method disclosed in JPA 2000-125174 merely compensates for the lens distortion. This method cannot correct the image distortion resulted from the curvature of the film surface at the exposure in the lens-fitted photo film unit or the like.

SUMMARY OF THE INVENTION

In view of the foregoing, an object of the present invention is to provide a uncomplicated and thus time-saving method of correcting image data picked up from pictures photographed through a simple taking lens having a distortion.

Another object of the present invention is to provide an uncomplicated and thus time-saving method of correcting image data picked up from pictures photographed through a simple taking lens on photographic film that is held curved behind the taking lens.

According to an aspect of the present invention, an image data correction method for correcting image data picked up from an original image photographed in an exposure frame on a photographic film through a taking lens while holding the exposure frame curved along a direction of the exposure frame, so as to eliminate image distortion in the original image, comprises the steps of:

setting up an orthogonal coordinate system having an origin at an intersection between an optical axis of the taking lens and the exposure frame, the X-axis of the coordinate system extending in the curved direction of the exposure frame, and the Y-axis of the coordinate system extending perpendicularly to the optical axis of the taking lens; approximating distortion in an image obtained by photographing straight-linear lines extending in the X-axis and Y-axis directions through the taking lens to circular arcs, wherein distortion in a first straight-linear line extending in the Y-axis direction is approximated to a circular arc which have a center of curvature on the X-axis and passing across an intersection of the first straight-linear line with the X-axis, and distortion in a second straight-linear line extending in the X-axis direction is approximated to a circular arc which have a center of curvature on the Y-axis and passing across an intersection of the second straight-linear line with the Y-axis, the circular arcs having different radii depending upon distances of the respective straight-linear lines from the origin; and rearranging the image data of respective pixels of the original image by transforming coordinates (x, y) of each pixel to coordinates (a, b), wherein "a" represents an x-distance of an intersection between the X-axis and one of the approximating circular arcs that has its center on the X-axis and passes across the coordinates (x, y), and "b" represents a y-distance of an intersection between the Y-axis and one of the approximating circular arcs that has its center on the Y-axis and passes across the coordinates (x, y).

According to a preferred embodiment, the approximating circular arcs are expressed by the following equations, and the coordinates (a, b) are calculated by use of these equations:

$$Rx^2=\{x-(a+Rx)\}^2+y^2;$$

$$Ry^2=x^2+\{y-(b+Ry)\}^2;$$

$$Rx=\alpha/a^{2n}; \text{ and}$$

$$Ry=\beta/b^{2m},$$

wherein Rx represents a radius of the approximating circular arc having the center on the X-axis, Ry represents a radius of the approximating circular arc having the center on the Y-axis, and $\alpha$, $\beta$, n and m represent coefficients predetermined in accordance with the distortion of the taking lens.

According to another aspect of the present invention, an image data correction method for correcting image data picked up from an original image photographed in an exposure frame on a photographic film through a taking lens while holding the exposure frame curved along a direction to be concave toward the taking lens, so as to eliminate image distortion in the original image, the image data correction method comprising the steps of:

obtaining a correlation between actual locations and ideal locations of respective pixels of the image data on the original image by calculating an actual location of each pixel on the basis of an ideal location of the pixel and correction parameters, the ideal location corresponding to an ideal image point of the pixel formed on a flat exposure frame through an ideal taking lens having no distortion, and the correction parameters being predetermined in accordance with the distortion of the taking lens and the curvature of the exposure frame at the exposure; and rearranging the image data by transforming each pixel to its ideal location in accordance with the correlation.

According to a preferred embodiment, the actual and ideal locations of the respective pixels in the exposure frame are represented by coordinates of an orthogonal coordinate system having an origin at an intersection between an optical axis of the taking lens and the exposure frame, the X-axis of the coordinate system extending in the curved direction of the exposure frame, and the Y-axis of the coordinate system extending perpendicularly to the optical axis of the taking lens; and the correlation between the actual locations and the ideal locations are obtained by use of the following equations:

$$Fx=Rf\cdot\tan^{-1}\{Wx/(Rf-Wz)\};$$

$$Fy=\{(Lc-Wz)\cdot Dy\}/Lc;$$

$$Dx=Px\cdot(1+C\alpha\cdot\sqrt{H1}+C\beta\cdot H1+C\gamma\cdot H1^2);$$

$$Dy=Px\cdot(1+C\alpha\cdot\sqrt{H1}+C\beta\cdot H1+C\gamma\cdot H1^2);$$

$$H1=\sqrt{(Px^2+Py^2)};$$

$$Wx=\{-Dx/(M\cdot Lc)\}\cdot\{N-\sqrt{(N^2-M\cdot Dx^2)}-M\cdot Lc)\};$$

$$Wz=\{N-\sqrt{(N^2-M\cdot Dx^2)}\}/M;$$

$$M=1+(Dx^2/Lc^2); \text{ and}$$

$$N=Rf+(Dx^2/Lc),$$

wherein Fx and Fy represent an x-distance and a y-distance of the actual location of a pixel, Px and Py represent an x-distance and a y-distance of the ideal location of the pixel, $C\alpha$, $C\beta$, $C\gamma$ represent the correction parameters predetermined in accordance with the distortion of the taking lens, Rf represents a radius of curvature of the exposure frame at the exposure, and Lc represents a distance of a center of exit pupil of the taking lens to the intersection between the optical axis of the taking lens and the exposure frame, Rf and Lc being the correction parameters predetermined in accordance with the curvature of the exposure frame at the exposure.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 4 is a block diagram illustrating a digital printer embodying an image data correction method of the present invention;

DETAILED DESCRIPTION OF THE EMBODIMENTS

Figure 1:
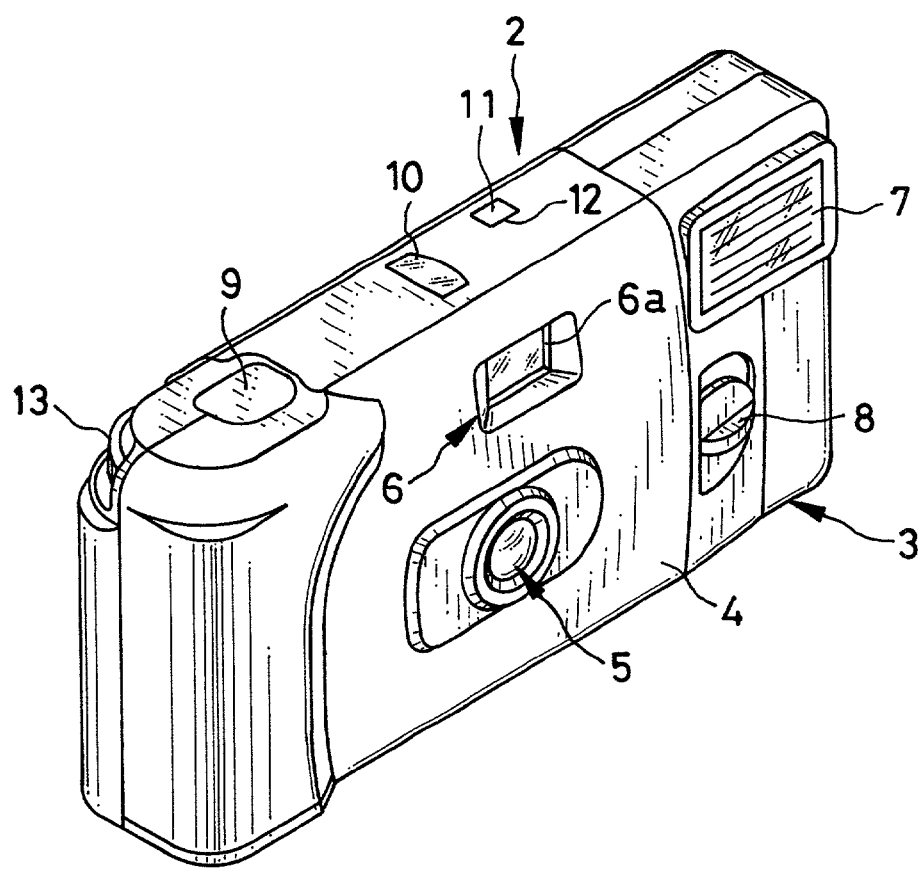
FIG. 1 is a perspective view of an example of a film unit in which a photo filmstrip is curved forwardly concave behind a taking lens.

As shown for example in FIG. 1, a film unit 2 consists of a unit body 3 having various photographic mechanism incorporated thereinto, and a label 4 that is put around the unit body 3.

On the front side of the unit body 3 are provided a taking lens 5, an objective window 6a of a viewfinder 6, a flash projector 7, a flash operation member 8 for turning a flash unit ON and OFF. On the top side are provided a shutter button 9, a counter window 10 for indicating the remaining number of available exposures, and an opening 12 through which a light guide 11 may protrude out as an indicator for indicating the completion of charging the flash unit. On the back side of the unit body 3, a winding wheel 13 is exposed outside, for being turned after each photography.

Figure 2:
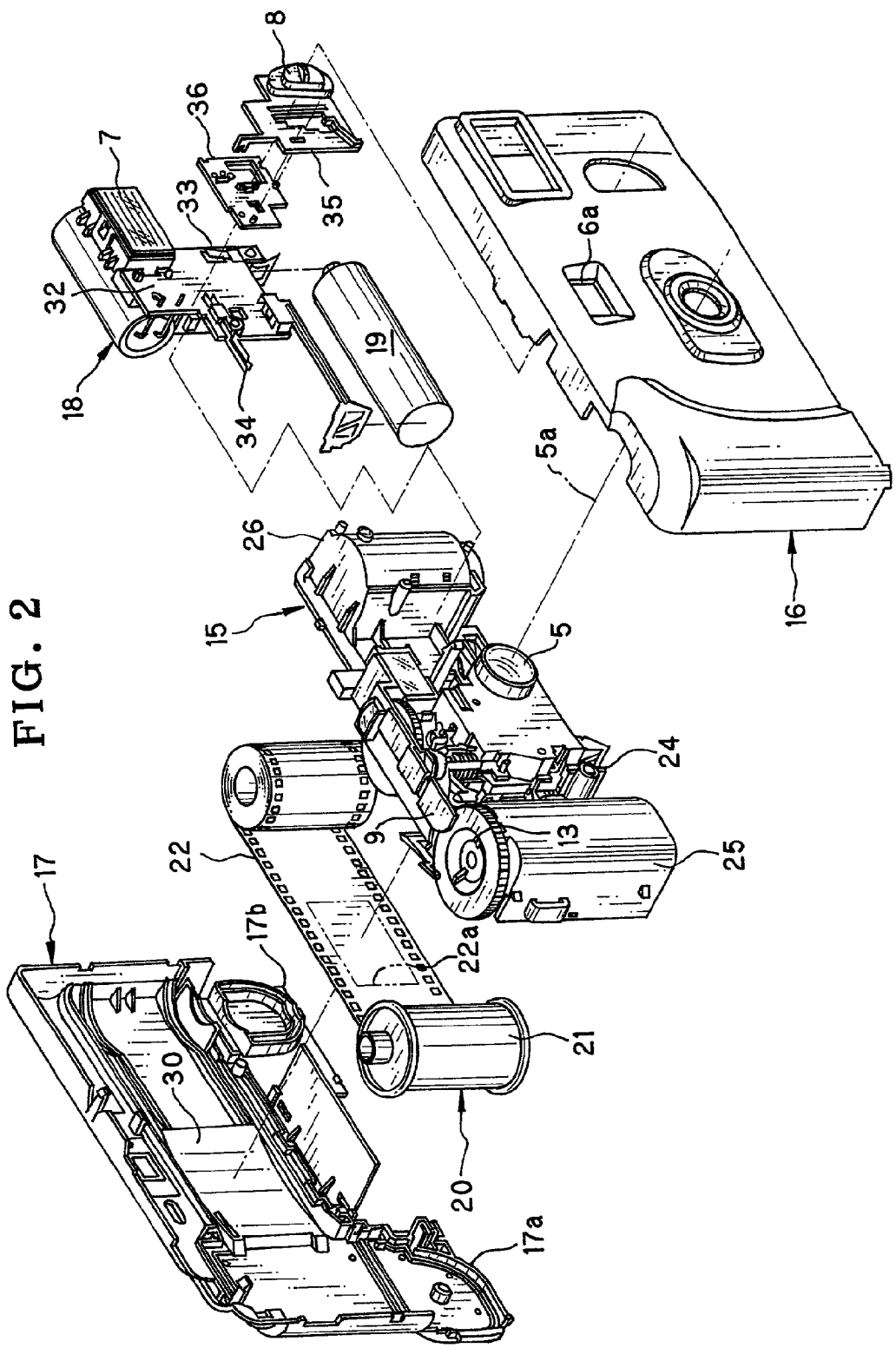
FIG. 2 is an exploded perspective view of a unit body of the film unit of FIG. 1.

As shown in FIG. 2, the unit body 3 is mainly constituted of a body basic portion 15, a front cover 16, a rear cover 17, a flash unit 18, and a battery 19. An unexposed photo film cartridge 20 is loaded in the unit body 3 on manufacturing the film unit 2. In the shown embodiment, the photo film cartridge 20 is of a 135-type, and consists of a cartridge shell 21 and a negative photo filmstrip 22.

A light-shielding chamber 24 is formed integrally with the body basic portion 15 on its front middle portion, for shielding a photographic light path from the taking lens 5 to the photo filmstrip 22 from extraneous light. A cartridge chamber 25 and a film chamber 26 are formed integrally on opposite horizontal sides of the light-shielding chamber 24, for holding the cartridge shell 21 and the photo filmstrip 22 as coiled into a roll, respectively.

Figure 3:
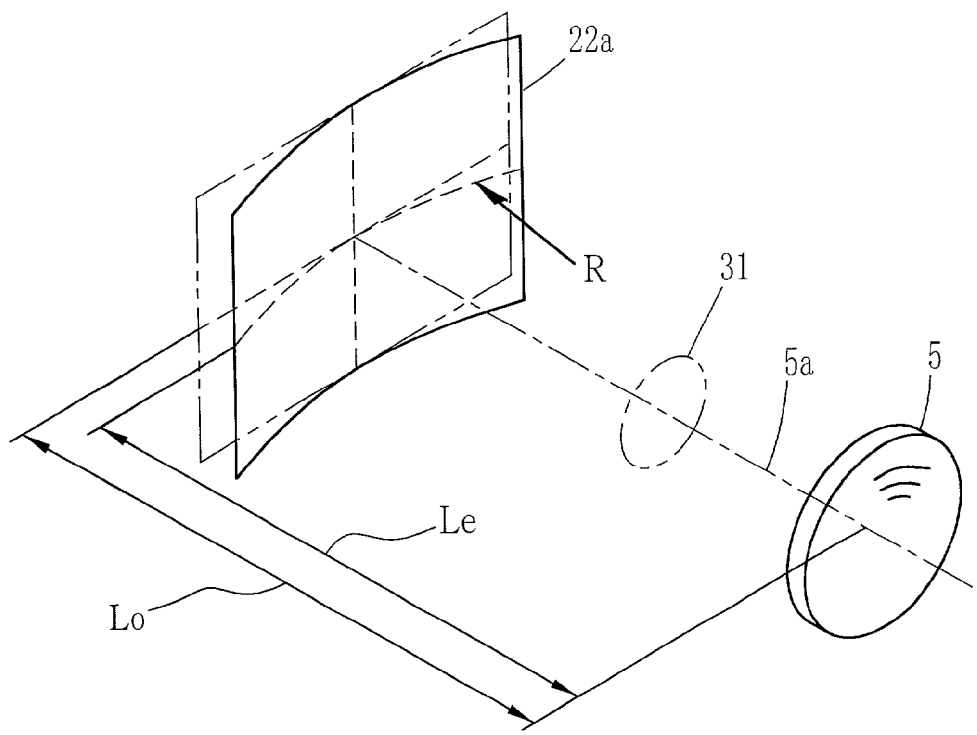
FIG. 3 is an explanatory diagram illustrating a positional relationship between the taking lens, a stop aperture and an exposure frame of the photo filmstrip.

Outside the light-shielding chamber 24 are mounted members of a shutter mechanism, a frame counter mechanism and other photographic mechanisms as well as the taking lens 5. A not-shown exposure aperture is formed in the rear side of the light-shielding chamber 24, to define an exposure frame 22a of the photo filmstrip 22, i.e., an area exposed to the optical image, or the size of a picture frame on the photo filmstrip 22. Since the photo film cartridge 20 is of ISO 135-type in this embodiment, the exposure aperture and an exposure frame 22a are sized about 24×36 mm, of which longer sides extend in the lengthwise direction of the photo filmstrip 22. As shown in FIG. 3, the center of the exposure aperture and thus the center of the exposure frame 22a are located on an optical axis 5a of the taking lens 5.

The winding wheel 13 is rotatably mounted on the top side of the cartridge chamber 25. The winding wheel 13 is turned to wind up the exposure frame 22a after exposed into the cartridge shell 21, and place a next unexposed exposure frame 22a behind the exposure frame.

The rear cover 17 is attached to the body basic portion 15 to cover the rear and bottom sides of the body basic portion 15, after the cartridge shell 21 and the rolled photo filmstrip 22 are loaded in the cartridge chamber 25 and the film chamber 26. The rear cover 17 is integrally formed with bottom lids 17a and 17b for closing bottom sides of the cartridge chamber 25 and the film chamber 26 in a light-tight fashion. The rear cover 17 has a film backing surface 30 in a section facing the exposure aperture of the body basic portion 15. A gap between the film supporting surface 30 and the body basic portion 15 makes a film advancing path from the cartridge chamber 25 to the film chamber 26.

The film supporting surface 30 is curved to be concave on the object side along the film advancing direction. Guide rails are provided above and below the exposure aperture, which are curved to be convex on the image side along the film advancing direction complementary to the film supporting surface 30. According to the curved film backing surface 30 and the curved guide rails, the exposure frame 22a as being placed behind the exposure aperture is held curved along its lengthwise direction with the center of curvature located on the object side, i.e. on the side of the taking lens 5, at a radius of curvature R. Thereby, blurs of the optical image formed in the exposure frame 22a, that are caused by the curvature of field of the taking lens 5, are reduced.

The flash unit 18 is constituted of a printed circuit board 32 having components of a flash circuit mounted thereon, the flash projector 7 consisting of a flash discharge tube, a reflector and a diffusion plate, a charge switch 33, a sync-flash switch 34, a switch plate 35 integrated with the flash operation member 8, and a supporting plate 36 supporting the switch plate 35 and guiding to slide up and down thereon. The battery 19 is a power source of the flash unit 18. The flash unit 18 starts charging upon the charge switch 33 being turned on by sliding up the flash operation member 33, and projects a flash light upon the sync-flash switch 34 being turned on synchronously with a shutter blade opening up a shutter aperture.

The front cover 16 covers the front of the body basic portion 15, after the photographic mechanisms and the flash unit 18 are attached to the front of the body basic portion 15. The front cover 16 has openings formed through its front side, for exposing the objective window 6a of the viewfinder 6, the taking lens 5, the flash projector 7, and the flash operating member 8.

Before the photo film cartridge 20 is loaded in the film unit, a unit type code specific to the type of the film unit is optically printed as a latent image on a lateral side of the photo filmstrip 22. According to an embodiment of the present invention, the unit type code is utilized for determining correction values for correcting image data picked up from picture frames recorded on the photo filmstrip 22, as will be described in detail later. The corrected image data is used for making photo-prints of the picture frames.

FIG. 4 shows a digital printer embodying the method of the present invention. The digital printer 40 is roughly constituted of an image input section 41 and an image printing section 42 for printing pictures on photographic paper. The image input section 41 functions as a correcting device, and is constituted of a code reader 43, a scanner 44 for picking up image data of a color picture from each exposure frame 22a on the photo filmstrip 22, an image memory 44, an image processing circuit 46 and a controller 47 for controlling these components.

When the photo filmstrip 22 as developed is placed in the digital printer 40, a not shown film advancing mechanism advances the photo filmstrip 22 toward the scanner 44 through the code reader 43. The code reader 43 consists of a light source for illuminating the photo filmstrip 22 and a photo sensor located across a film advancing path from the light source, though details of these components are not shown in the drawing. The photo sensor reads out the type code optically from the photo filmstrip 22 as it is advanced through the code reader 43, wherein the unit type code is developed to be a visible image concurrently with the photographed pictures. The code reader 43 reads out the unit type code once for each filmstrip, and sends data of the unit type code to the controller 47. The controller 47 transfers the unit type code to the image processing circuit 46.

The scanner 44 consists of a film carrier for holding the photo filmstrip 22 to be flat, an illuminating device that diffuses light from a lamp and illuminates the exposure frame 22a as being placed in the film carrier, a CCD, and an optical system for forming a color optical image of the photographed picture on the CCD, though details of these components are not shown in the drawing. The scanner 44 picks up photometric signals for red, green and blue from the color picture recorded in each of the exposure frames 22a, each after the photo filmstrip 22 is advanced by one frame, by converting the optical image into electric signals through the CCD according a three-color separation method. The scanner 44 sends the photometric signals to an A/D converter 48.

The A/D converter 48 converts the photometric signals into digital image data for each color. The three color image data is written on the image memory for each color. The image processing circuit 46 reads out the image data from the image memory 45 after the image data of one picture frame is written on the image memory 45, and processes the image data to be suitable for use in printing, and for improving quality of pictures as printed based on the processed image data. The image processing circuit 46 processes image data as picked up from those photo filmstrips 22 having unit type codes recorded thereon, first for an image distortion correction and then for usual image correction processes, including color correction, negative-to-positive conversion and the like. The image distortion correction process will be described in detail later. The image data processed in the image processing circuit 46 is sent to the image printing section 42.

To the image processing circuit 46 are connected a work memory 46a and an EEPROM 46b. Before making the image distortion correction process, the image processing circuit 46 produces a lookup table (LUT) in the work memory 46a. The LUT is constituted of data for use in coordinate transformation of image data of one frame, and is applied to every exposure frame 22a of the same photo filmstrip 22. Using the same LUT for the same photo filmstrip 22 saves the time of data processing. Besides the LUT, the work memory 46a temporally stores data necessary for the image processing circuit 46 to perform the image processing.

The EEPROM 46b stores different sets of coefficients $\alpha$, $\beta$, n, m, $\gamma$, $\delta$, $\epsilon$ and $\zeta$ as correction parameters for different types of film units. The coefficients $\alpha$, $\beta$, n and m are used in making approximation of the distortions of the photographed image to circles, whereas the coefficients $\gamma$, $\delta$, $\epsilon$ and $\zeta$ are used in formulas for correcting changes in image magnification of the photographed image that are resulted form the curvature of film surface at the exposure. The image processing circuit 46 reads out a corresponding set of the coefficients $\alpha$, $\beta$, n, m, $\gamma$, $\delta$, $\epsilon$ and $\zeta$ in accordance with the unit type code read out from the photo filmstrip 22, and carries out the image distortion correction process with these coefficients $\alpha$, $\beta$, n, m, $\gamma$, $\delta$, $\epsilon$ and $\zeta$ for correcting the distortions and the magnification changes of the photographed image. Since the correction parameters are stored in the EEPROM 46b, it is possible to add a new set of correction parameters for a new type film unit to the EEPROM 46b, when the new type lens-fitted photo film unit is brought into the market.

The image printing section 42 is constituted of an image memory 51, a laser unit 52 for emitting laser rays of red, blue and green, a driver 53 for driving the laser unit 52, a polygonal mirror 54, an F-θ lens 55, and a not-shown paper advancing mechanism for advancing a long web of color photographic paper 56 in a lengthwise direction thereof. The corrected image data from the image input section 41 is written on the image memory 51. The output of the laser unit 52 is controlled based on the corrected image data, to project laser rays toward the polygonal mirror 54 while it is turning at a high speed. As a result, the laser rays are scanned in a widthwise direction of the color photographic paper 56, that is perpendicular to the paper advancing direction. Thus a color image of the exposure frame 22a is printed line by line on the color photographic paper 56. After having the color image printed thereon, the color photographic paper 56 is developed in a not-shown photographic processing section, and is cut into a sheet of photo-print.

Now the detail of the image distortion correction process in the image processing circuit 46 will be described.

Figure 5:
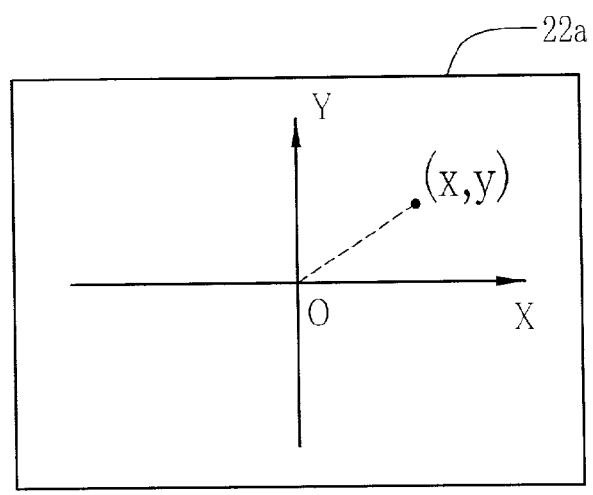
FIG. 5 is an explanatory diagram illustrating a coordinate system for locating respective points in the exposure frame.

As shown in FIG. 5, the image processing circuit 46 uses an orthogonal coordinate system to express an appropriate point on the photo filmstrip 22, wherein the X-axis extends in the lengthwise direction of the photo filmstrip 22, i.e. the curved direction of the photo filmstrip 22, and the Y-axis crosses the X-axis at the center of the exposure frame 22a, i.e. at the intersection of the optical axis 5a of the taking lens 5 with the photo filmstrip 22 on the exposure. That is, an appropriate point on the exposure frame 22a is expressed as coordinates (x, y), while taking consideration of the curvature of the exposure frame 22a at the exposure.

In this coordinate system, the image processing circuit 46 sets up approximating circular arcs that approximate distortions in originally rectilinear lines of an image photographed through the taking lens 5. Among these approximating circular arcs, an approximating circular arc C1 that passes through a point (x, y) with its center on the X-axis, and an approximating circular arc C2 that passes through the point (x, y) with its center on the Y-axis are picked up, to derive an intersection Pa of the first approximating circular arc C1 with the X-axis and an intersection Pb of the second approximating circular arc C2 with the Y-axis, wherein Pa=(a, 0) and Pb=(0, b). Thereafter, the image data is rearranged while transforming the pixel location from the coordinates (x, y) to the coordinates (a, b).

Figure 7:
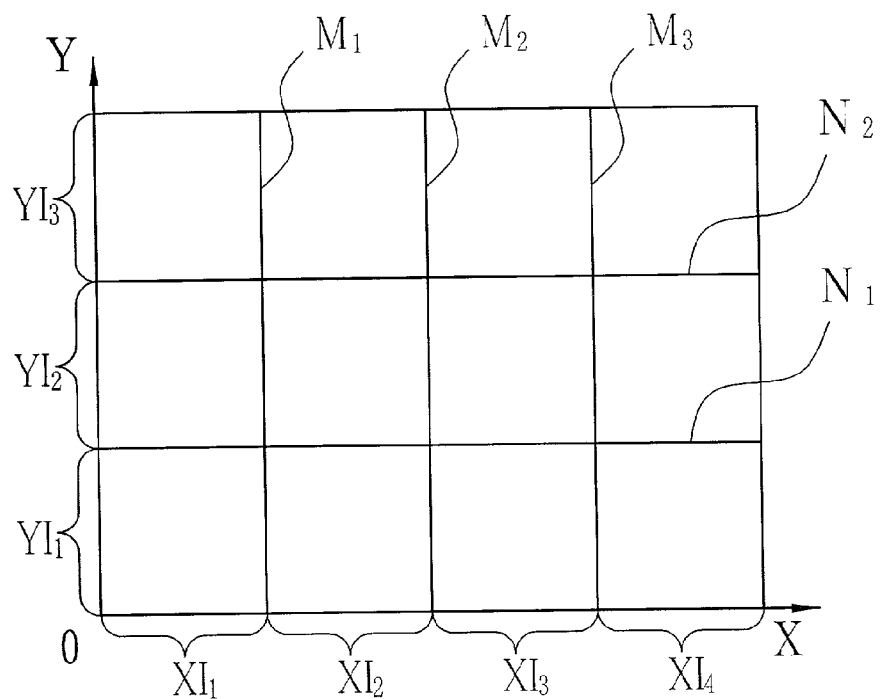
FIG. 7 is a fragmentary view of a grid chart having a square grid.
Figure 8:
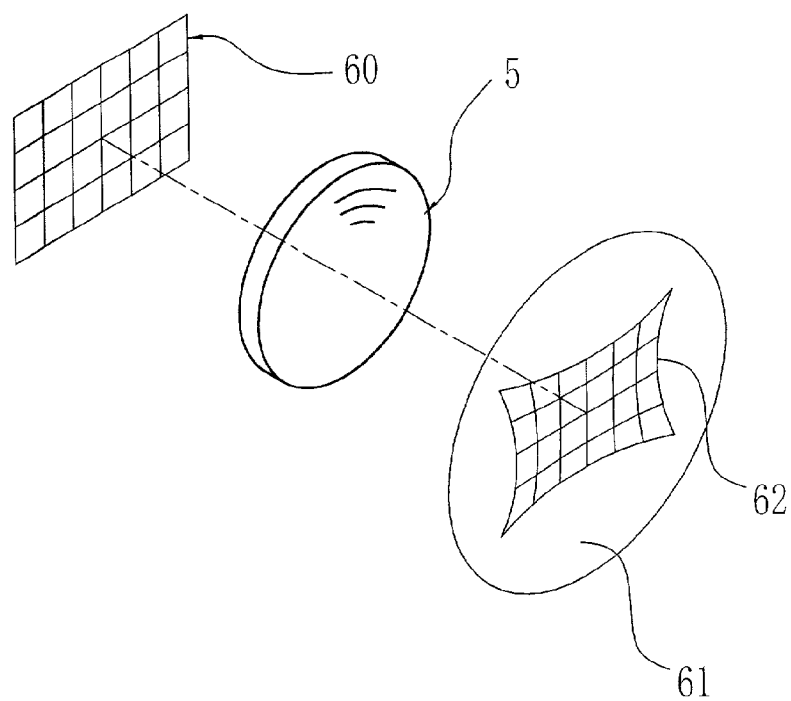
FIG. 8 is an explanatory diagram illustrating an image of the grid chart that is distorted because of the distortion of the taking lens.

The image distortion correction process of the present embodiment will be described more specifically with respect to an example shown in FIGS. 7 to 10, wherein a grid chart 60 having a square grid on a flat surface is photographed through the taking lens 5 that has distortions. FIG. 7 simply shows the first quadrant of the coordinate system that represents the exposure frame 22a, and designates vertical lines as M1, M2, M 3, . . . in this order from the Y-axis, and transverse lines as N1, N2, . . . in this order from the X-axis. As these longitudinal and transverse lines form the squares, the intervals XI1, XI2, XI3 . . . between the vertical lines as well as the intervals YI1, YI2, YI3 . . . between the transverse lines are equal to each other: XI1=XI2=XI3=YI1=YI2=YI3. . . .

Where the lens has such distortions as the taking lens 5 of the lens-fitted photo film unit 2 has, an image 62 of the grid chart 60 formed on an image plane 61 is distorted like as shown in FIG. 8. As a result, when the grid chart 60 is photographed on the photo filmstrip 22, both the longitudinal and the transverse lines M1, M2, M3, N1, N2, . . . are distorted like as shown by M1', M2', M3', N1' and N2' in FIG. 9. Besides the distortions of the respective lines, the intervals XI1, XI2, XI3, YI1, YI2, YI3 . . . between the lines are charged because of the changes in image magnification, as shown by XI1', XI2', XI3', YI1' and YI2' in FIG. 9, wherein XI1', XI2' and XI3' represent the intervals on the X-axis, and YI1' and YI2' represent the intervals on the Y-axis, and XI1'=YI1'≠XI2'≠YI2'≠XI3'=YI3'. . . .

Figure 10:
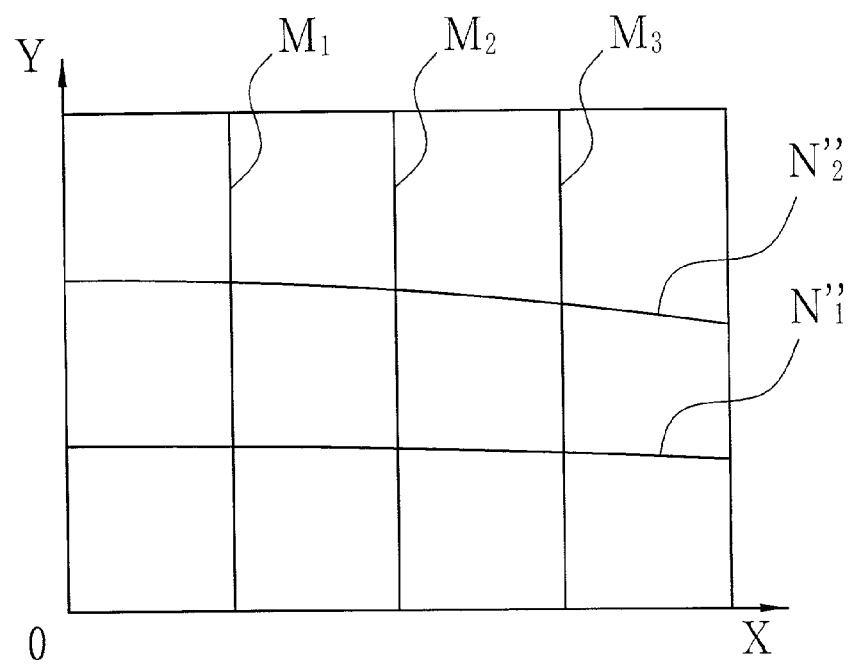
FIG. 10 is a fragmentary view of an image of the grid chart photographed on a photo filmstrip as curved along a lengthwise direction of the filmstrip.

Since the exposure frame 22a of the photo filmstrip 22 loaded in the lens-fitted photo film unit 2 is held curved at the exposure, as shown in FIG. 3, the image formed on the exposure frame 22a will suffer a distortion from this curvature, because the distance from the taking lens 5 to the film surface varies within the exposure frame 22a. That is, the exposure frame 22a has a shorter axial distance Le from the taking lens 5a at the right and left sides than an axial distance Lo at the center point, which appears as a magnification change in the photographed image. Such an image distortion as resulted from the curvature of the film surface is shown in FIG. 10 with respect to an example where the grid chart 60 is photographed through the taking lens 5, supposing that the taking lens 5 has no distortion, for convenience sake. In this case, the transverse lines N1, N2, . . . are distorted toward the X-axis the larger degree as the x-distance increases.

Figure 9:
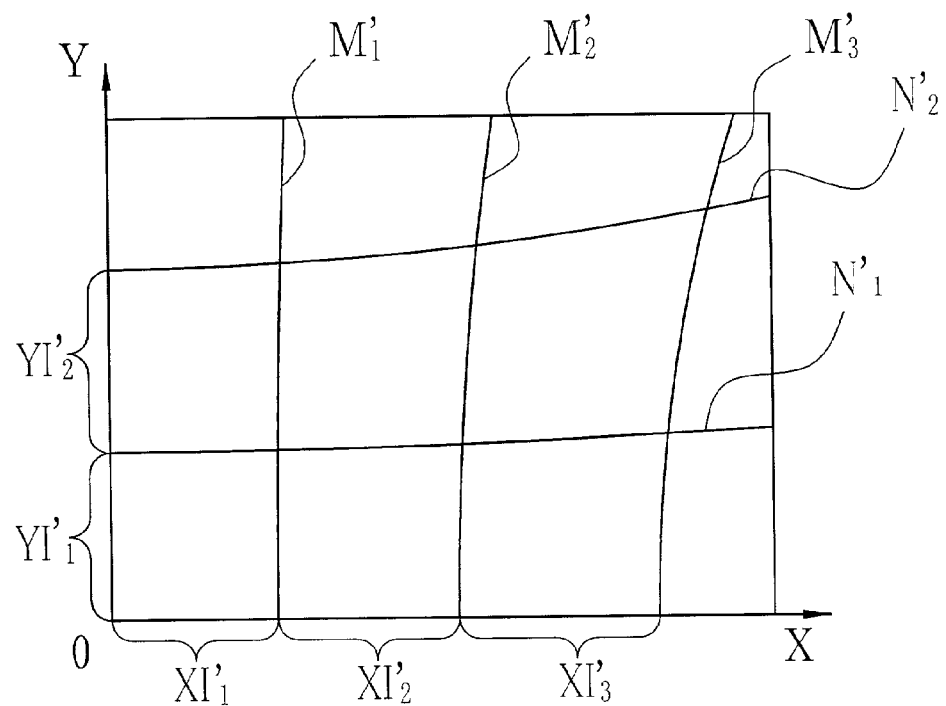
FIG. 9 is a fragmentary view of the distorted image of the grid chart.

Although the image distortions have been described with respect to the first quadrant of the coordinate system, for convenience sake, it is apparent that the image suffers the distortions in other portions of the exposure frame 22a that are represented by the second to fourth quadrants of the coordinate system, in the same way as shown in FIGS. 9 and 10, but symmetrically about the X- and Y-axes.

As described so far, the image photographed through the lens-fitted photo film unit 2 usually suffers both the distortion resulted from the lens distortion of the taking lens 5 and the distortion resulted from the curvature of the film surface at the exposure. That is, these distortions are mixed in the image photographed on the exposure frame 22a. So the image processing circuit 46 corrects the image data so that the vertical lines M1, M2, M3 . . . and the transverse lines N1, N2, N3 . . . of the grid chart 60 will be restored to be rectilinear, and that the intervals between these lines will be restored to be constant: XI1=XI2=XI3=YI1=YI2=YI3.

To correct the distortion of the lines, the image processing circuit 46 reads out the coefficients α, β, n and m from the EEPROM 46b in accordance with the unit type code, and sets up approximating circular arcs that approximate distortions of rectilinear lines, to make the above described coordinate transformation, using these coefficients α, β, n and m. Concretely, the coefficients α, β, n and m are used for calculating a radius Rx of the approximating circular arc C1 and a radius Ry of the approximating circular arc C2.

Figure 6:
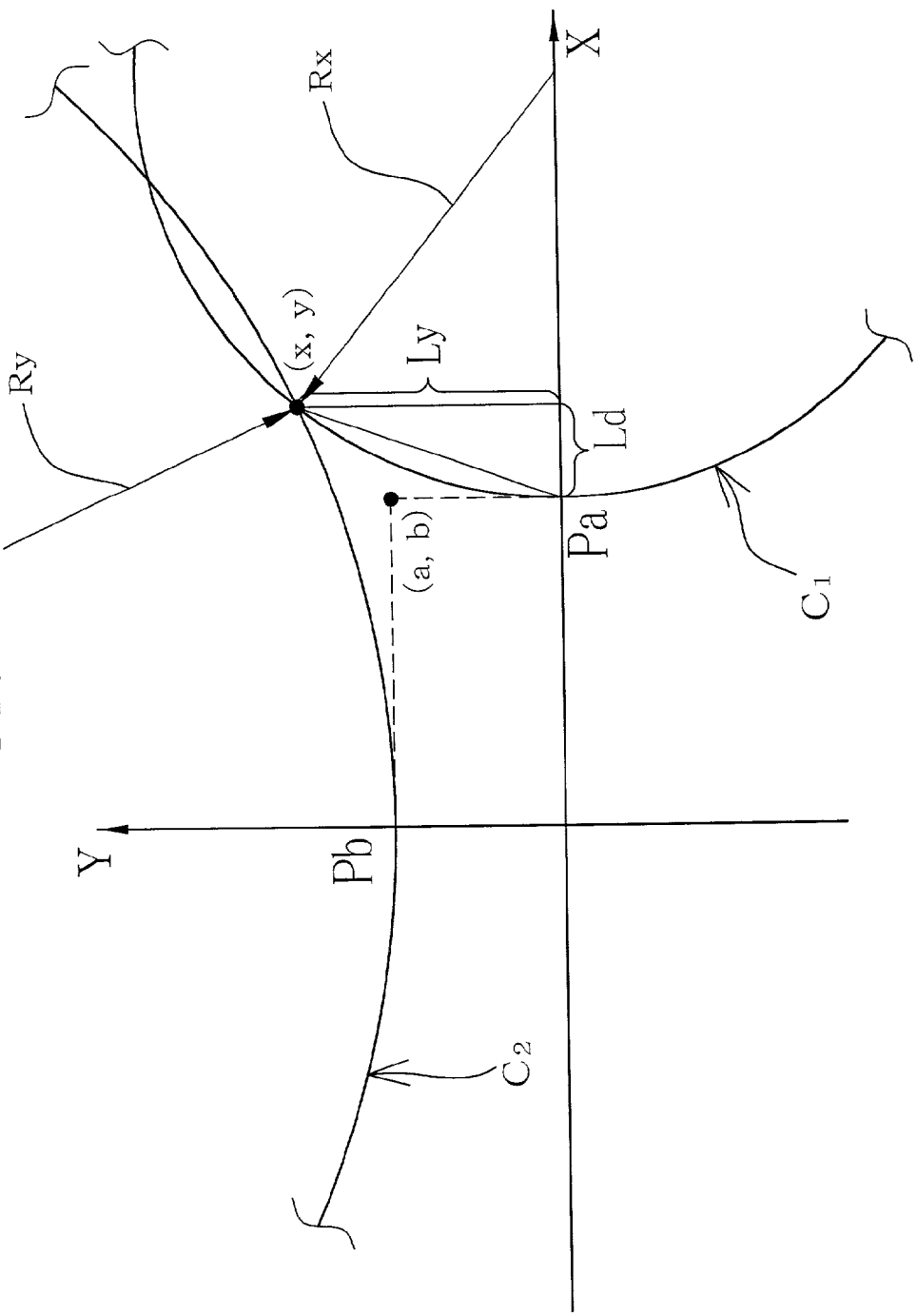
FIG. 6 is an explanatory diagram illustrating a relationship between circles approximating distortion in an image photographed through the taking lens, coordinates of a pixel before the coordinate transformation, and coordinates of the same pixel after the coordinate transformation.

Assuming that the circles C1 and C2 approximate the distortion from a given original point (a, b) to a point (x, y) on the photographed image, as shown in FIG. 6, the relationships between the radii Rx and Ry and the coordinate values "a" and "b" on the abscissa and the ordinate may be expressed by the following equations respectively:

$$Rx = \alpha/a^{2n}, \quad Ry = \beta/b^{2m} \tag{1}$$

wherein α and β are proportional coefficients, and n and m are exponential coefficients. The above equations show that the radius Rx decreases as the value "a" or x-distance increases, and that the radius Ry decreases as the value "b" or y-distance increases. That means, the degree of distortion is greater in the marginal area of the exposure frame 22a. On the contrary, as the value "a" or "b" decreases, the radius Rx or Ry increases. In the central area of the exposure frame 22a, the radius Rx or Ry gets closer to the infinity, and thus the distortion is little, because where the radius Rx or Ry approaches the infinity, the circumferential line of the approximating circular arc C1 or C2 approaches the rectilinear. The values α, β, n and m are determined for each type of the film unit on the basis of design values and actual results, by measuring distortions of actually photographed images, e.g. images of a grid chart, with respect to some points, e.g. at intersections of the vertical and transverse lines, and calculating the radii Rx and Ry based on the actual measurement values, and then applying a regression analysis, like the method of least square, to the above equations (1). The coefficients α, β, n and m obtained in this way are written in association with each unit type code in the EEPROM 46b.

Using the coefficients α, β, n and m selected in accordance with the unit type code, the image processing circuit 46 carries out calculations for the transformation of the coordinates (x, y) to the coordinates (a, b). The approximating circular arc C1 on the abscissa and the approximating circular arc C2 on the ordinate are expressed by the following equations (2) and (3) respectively:

$$\{x-(a+Rx)\}^2 + y^2 = Rx^2 \tag{2}$$

$$\{y-(b+Ry)\}^2 + x^2 = Ry^2 \tag{3}$$

Because the coordinates (x, y) represent an intersection between the approximating circular arc C1 and the approximating circular arc C2, the following equations (4) and (5) may be derived from the above equations (1) to (3):

$$x = \{-E \pm (E2 - FD)^{1/2}\}/2D \tag{4}$$

$$y = \pm\{Rx^2 - (x-A)^2\}^{1/2} \tag{5}$$

wherein $$F = C^2 - 4B^2 Rx^2 + 4A^2 B^2$$

$$E = A(C - 2B^2)$$

$$D = A^2 + B^2$$

$$C = Rx^2 - Ry^2 - A^2 + B^2$$

$$A = a + Rx$$

$$B = b + Ry$$

$$Rx = \alpha/a^{2n}, \quad Ry = \beta/b^{2m}$$

Although a plurality of coordinates (x, y) would be obtained from the above equations (4) and (5), it can be easy to select appropriate ones according to the polarity of the input parameters. As apparent from the equation (1), where the x-distance or the y-distance is very small, the radius Rx or Ry approximates to the infinity, so the calculation can overflow in some software sequence. To avoid such a trouble, it is necessary to provide an operation process for deciding not to make the coordinate transformation, but to enter the numerical values directly through an external operation.

To compensate for the change in image magnification that results the change in interval between the lines of the grid chart 60, the image processing circuit 46 makes a coordinate transformation as set forth below. That is, the coordinates (a, b) as obtained according to the above equations, are transformed to coordinates (a', b') where the influence of the change in image magnification is eliminated.

$$a = \gamma a' + \delta a'^2 \quad (6)$$

$$b = \epsilon b' + \zeta b'^2 \quad (7)$$

wherein $\gamma$, $\delta$, $\epsilon$ and $\zeta$ are proportional coefficients.

The proportional coefficients $\gamma$, $\delta$, $\epsilon$ and $\zeta$ are derived from actually measured values of changes in image magnification at given measurement points in the exposed frame, on the basis of design values and experimental results, by applying a regression analysis, like the method of least square, to the equations (6) and (7), in the same way as for the above equation (1). The proportional coefficients $\gamma$, $\delta$, $\epsilon$ and $\zeta$ are predetermined in this way for each film unit type, and written on the EEPROM 46a in relation to the unit type codes, like as the above coefficients ($\alpha$, $\beta$, n and m. Thus, the image processing circuit 46 reads out the proportional coefficients $\gamma$, $\delta$, $\epsilon$ and $\zeta$ from the EEPROM 46a in response to the unit type code, concurrently with the coefficients $\alpha$, $\beta$, n and m, for use in the calculation for correcting the image data in compensation for the image magnification change.

Since the distortions and the image magnification changes in the image are symmetrical about the X- and Y-axes of the exposure frame 22a, it is possible to carry out the calculation for the above coordinate transformation merely with respect to the first quadrant of the coordinate system, where the x-distance and the y-distance both have the positive values, and derive corrected values for the second to fourth quadrants from the corrected values obtained from the calculation about the first quadrant.

For convenience sake, the coordinates (x, y) of any point in the first quadrant will be expressed as (x1, y1), and the point obtained by the coordinate transformation of the point (x1, y1) in the image distortion correction process will be expressed as (a1, b1). In the same way, any point in the second, the third or the fourth quadrant will be expressed as (x2, y2), (x3, y3) or (x4, y4) respectively, and the point obtained by the coordinate transformation of the point (x2, y2), (x3, y3) or (x4, y4) in the image distortion correction process will be expressed as (a2, b2), (a3, b3) or (a4, b4) respectively. Where the absolute values of these coordinate values are equal to each other: |x1|=|x2|=|x3|=|x4|, |y1|=|y2|=|y3|=|y4|, the coordinates in the second to fourth quadrants may be expressed as follows:

$$(x2, y2) = (-x1, y1) \quad (8)$$

$$(x3, y3) = (x1, -y1) \quad (9)$$

$$(x4, y4) = (-x1, -y1) \quad (10)$$

The same applies to the relationship between the coordinates (a1, b1) and the coordinates (a2, b2), (a3, b3) or (a4, b4) obtained by the coordinate transformation:

$$(a2, b2) = (-a1, b1) \quad (11)$$

$$(a3, b3) = (a1, -b1) \quad (12)$$

$$(a4, b4) = (-a1, -b1) \quad (13)$$

Accordingly, utilizing the equations (11) to (13) makes it possible to reduce the volume of calculation for the coordinate transformation, and thus speed the image correction process.

Now the overall operation of the film unit 2 and the digital printer 40 will be described.

Before the photo film cartridge 20 is loaded in the unit body 3 of the film unit 2, a unit type code representative of the type of the assigned film unit 2 is optically printed on the photo filmstrip 22 in the factory. After the unit body 3 is loaded with the photo filmstrip 22 and the cartridge shell 21, and is completely assembled, the label 4 is put around the unit body 3, to finish manufacturing the film unit 2.

To take pictures by the film unit 2, the film winding wheel 13 is turned to wind up the photo filmstrip 22 by one frame, thereby to place an unexposed exposure frame 22a behind the exposure aperture and cock the shutter mechanism at the same time. Thereafter, the photographer frames a subject through the viewfinder 6, and presses the shutter button 9. To make a flash photography, the photographer first slides up the flash operation member 8, and presses the shutter button 9 after the flash unit 18 is charged up. Upon the shutter button 9 being pressed, the shutter blade is swung to open the shutter aperture.

While the shutter aperture opens, the photographic light passing through the taking lens 5 enters the light-shielding chamber 24, so the exposure frame 22a as placed behind the exposure aperture is exposed. At that time, the film surface of the exposure frame 22a is held forwardly concave along the lengthwise direction of the photo filmstrip 22.

Pictures are photographed one after another in the same way as above. After the completion of all available exposures, the user turns the winding wheel 13 continuously till the entire length of the photo filmstrip 22 is wound up into the cartridge shell 21. Then, the film unit 2 is forwarded to a photo-lab or an agency of a photofinisher.

In the photo-lab, the photo film cartridge 20 containing the exposed photo filmstrip 22 is removed from the unit body 3, to pull out and remove the photo filmstrip 22 from the cartridge shell 21. The photo filmstrip 22 is developed and then placed in the digital printer 40.

The digital printer 40 advances the photo filmstrip 22 toward the scanner 44. While the photo filmstrip 22 is being advanced, the controller 47 reads out the unit type code on the photo filmstrip 22 through the code reader 43, and sends the unit type code to the image processing circuit 46.

Upon receipt of the unit type code, the image processing circuit 46 reads out a corresponding set of the coefficients $\alpha$, $\beta$, n, m, $\gamma$, $\delta$, $\epsilon$ and $\zeta$ from among those stored in the EEPROM 46b. Then, the image processing circuit 46 obtains the coordinates (a, b) to correct the image distortion through the coordinate transformation, applying the read coefficients a, $\beta$, n and m to the equations (4) and (5), and then obtains the coordinates (a', b') to correct the image magnification change through the coordinate transformation, applying the read coefficients $\gamma$, $\delta$, $\epsilon$ and $\zeta$ to the equations (6) and (7). The image processing circuit 46 performs the calculation till the coordinates (a', b') are obtained for any pixel of the exposure frame 22a, and the obtained values are stored as the lookup table (LUT) in the work memory 46a, for use in the coordinate transformation for correcting the image data to eliminate the influence of the distortion of the taking lens 5 and the change in the image magnification.

Figure 11:
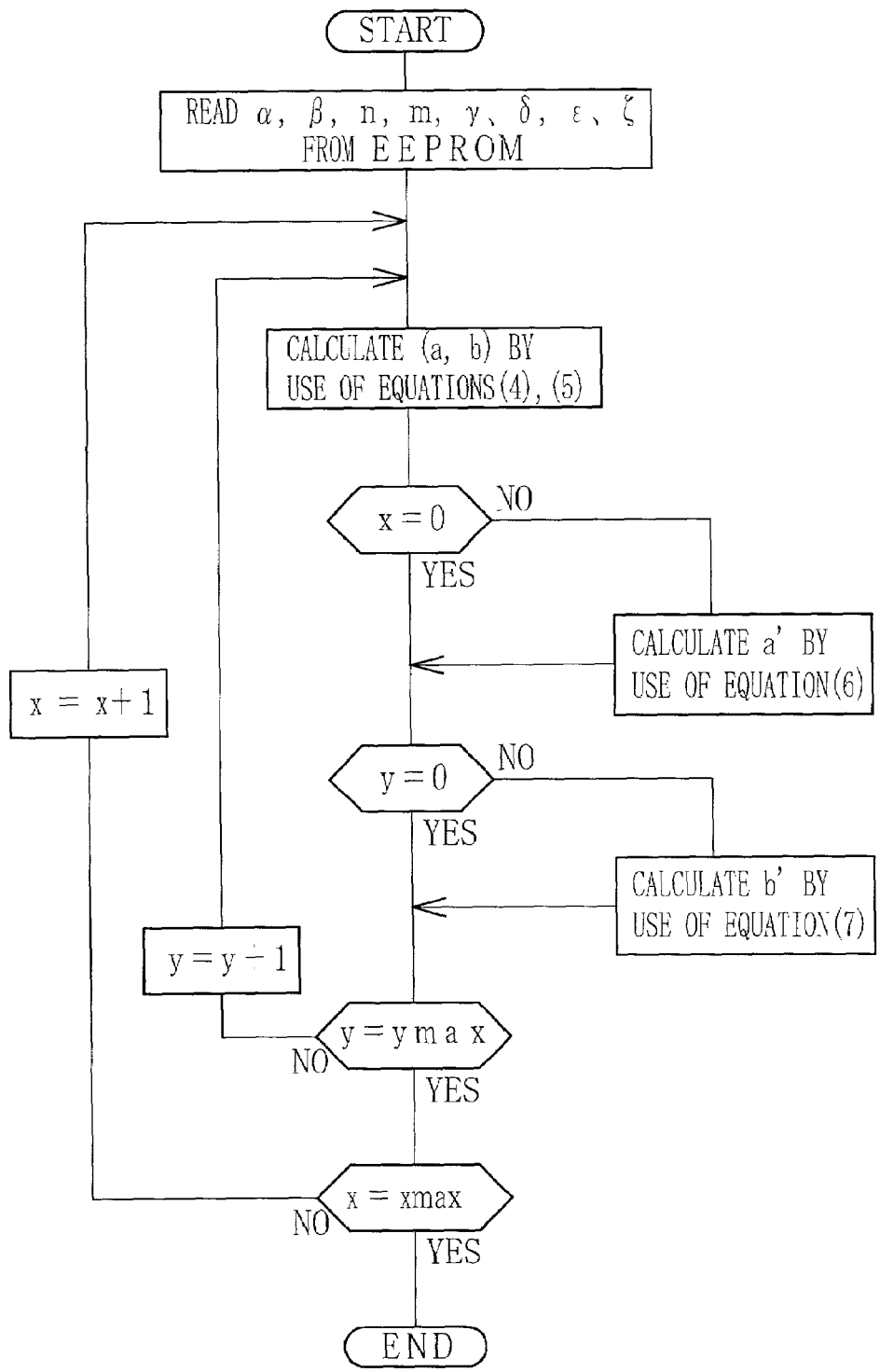
FIG. 11 is a flow chart illustrating a sequence of an image distortion correction process according to a first embodiment of the invention.

As shown in the flowchart of FIG. 11, the image processing circuit 46 makes the calculations for obtaining the LUT, with respect to each of predetermined points of the exposure frame 22a, i.e. each pixel in this embodiment, while varying the values "x" and "y" individually by a predetermined step corresponding to the pixel pitch. More specifically, the image processing circuit 46 starts the calculation from the origin (0, 0) and, while shifting the value "y" step by step in the positive direction, obtains the coordinates (a, b) from the coordinates (x, y) through the equations (4) and (5), and then obtains the coordinates (a', b') from the coordinates (a, b) through the equations (6) and (7). And the coordinates (a', b') obtained in this way are sequentially written on the work memory 46a. However, where the value "x" or x-distance or the value "y" or y-distance is zero, the calculation using the equation (6) or (7) is not executed respectively, because the value "a" or "b" does not change through this calculation in that case.

After the value "y" or y-distance reaches its maximum value y=ymax, that corresponds to the top edge of the exposure frame 22a, the x-distance is shifted one step in the positive direction, and then the coordinates (a, b) and the coordinates (a', b') are calculated in the same way while shifting the y-distance step by step in the positive direction. After the y-distance reaches the maximum value with respect to the same x-distance, the x-distance is further shifted one step in the positive direction, and then the coordinates (a, b) and the coordinates (a', b') are calculated in the same way while shifting the y-distance step by step in the positive direction. In this way, the coordinates (a, b) and the coordinates (a', b') are calculated in the same way till the x-distance reaches its maximum value that corresponds to a side edge of the exposure frame, while writing the obtained coordinates (a', b') on the work memory 46a.

When the calculations for the coordinates (a', b') are accomplished with respect to the first quadrant in this way, the coordinates (a', b') are calculated with respect to the second to fourth quadrants on the basis of the coordinates (a', b') obtained with respect to the first quadrant, using the equations (11), (12) and (13) respectively. The coordinates (a', b') obtained with respect to the second to fourth quadrants are also written on the work memory 46b, completing an LUT for one frame.

Figure 12:
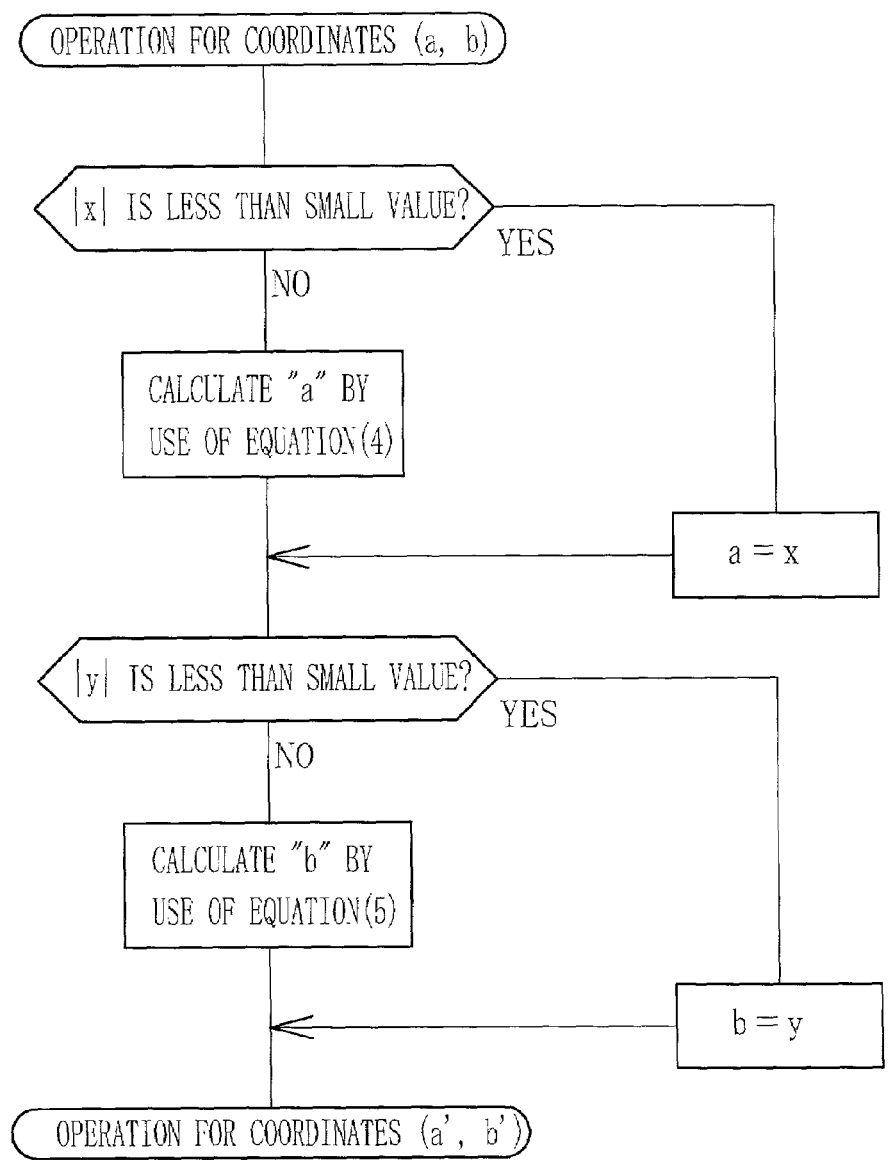
FIG. 12 is a flow chart illustrating a subsequence of the sequence of FIG. 11, for operation to approximating the image distortion to circles.

As described above, where the x-distance or the y-distance is very small, the radius Rx or Ry approximates to the infinity, so the calculation can overflow in some software sequence. An operation process for avoiding this trouble will be described with reference to the flow chart of FIG. 12. First, it is checked if the absolute value |x| is less than a given very small value. If so, the calculation according to the equation (4) is not executed, but the value "x" is substituted for the value "a". If the absolute value |x| is not less than the small value, the value "a" is calculated according to the equation (4). Thereafter, it is checked if the absolute value |y| is less than a given very small value. If so, the value "y" is substituted for the value "b". If the absolute value |y| is not less than the small value, the value "b" is calculated according to the equation (5). Since the lens distortions are so small in the range where the x-distance or the y-distance is very small, the image quality would not deteriorate even if the value "x" or "y" is substituted for the value "a" or "b" respectively. In this way, the overflow of the image processing circuit 46 is prevented with no problem.

Thereafter when the photo filmstrip 22 comes into the film carrier of the scanner 44, the photo filmstrip 22 stops. While the photo filmstrip 22 stops in the film carrier, a color picture recorded in the exposure frame 22a is read out by the scanner 44, and is converted into three color image data through the A/D converter 48. The three color image data is written on the image memory 45. When the original image data of the entire exposure frame 22a has been written on the image memory 45, the image processing circuit 46 reads out the original image data one pixel after another in a predetermined sequence by addressing the respective pixel.

After reading out the original image data of one frame, the image processing circuit 46 rearranges the original image data by use of the LUT as prepared and stored in the work memory 46a in the way as described above. Specifically, the image data of one pixel, including luminance, density, hue, lightness and saturation of the color image, is transformed from its original position on the exposure frame 22a that is represented by coordinates (x, y), to a position that is represented by coordinates (a', b'). Thereby, corrected image data of one frame is produced. After the image data of the photographed picture is thus compensated for the lens distortion of the taking lens 5, and for the change in the image magnification thereof, original image data of the next frame is read out from the image memory 45, and is subjected to the image distortion correction process in the same way as above. The subsequent corrected image data is written on the work memory 46a.

After the image distortion correction process, the corrected image data, as written on the work memory 46a, is subjected to ordinary image processing, such as color correction and negative-positive reversion process. Thereafter, the image processing circuit 46 writes the corrected image data on the image memory 51 of the image printing section 42.

The image printing section 42 prints the color picture as a latent image on the color photographic paper 56, while driving the laser unit 52 on the basis of the corrected three color image data of one frame as written on the image memory 51.

After the color picture of one frame starts being printed, the next exposure frame 22a is placed in the scanner 44, and the correction process is executed in the same procedure as above. It is to be noted that the same LUT as produced initially with reference to the unit type code of the photo filmstrip 22 is used for the correction process of the next and following exposure frames 22a of the same photo filmstrip 22. After the correction process is accomplished on the entire image data of the next frame, the corrected image data is subjected to the ordinary image processing, and then written on the image memory 51 of the image printing section 42. After the printing of the preceding color picture is completed, the next color picture is printed on the color photographic paper 56 on the basis of the corrected image data.

In this way, image data is picked up from the respective exposure frames 22a of the photo filmstrip 22, and is subjected to the correction process and the ordinary image processing, so color pictures are printed on the color photographic paper 56 on the basis of the corrected image data.

After having the color pictures printed thereon, the color photographic paper 56 is forwarded to the photographic processing section, where the color photographic paper 56 is developed, fixed and dried, and then cut into the individual pictures, which are ejected as photo-prints from the digital printer 40. Since the pictures are printed on the basis of the image data that is corrected in the way to compensate for the distortion of the original picture while taking account of the curvature of the film surface at the exposure, the image quality of the printed pictures is well improved.

In the image distortion correction process of the above embodiment, the calculation for coordinate transformation to correct the distortion is first carried out while approximating the distortion of the photographed picture to circles, and then the calculation for coordinate transformation to correct the magnification change is carried out. However, it is possible to carry out the calculation for coordinate transformation to correct the magnification change first, and then carry out the calculation for coordinate transformation to correct the distortion.

EXEMPLIFICATION

Now the image data correction method according to the first embodiment of the present invention will be described with reference to numerical data obtained from two examples. In the following description, the same reference numerals will be used for designating the same or equivalent parts of the examples as used in the above embodiment as illustrated in the drawings. In either example, the taking lens 5 is composed of two lens elements, i.e. a first lens and a second lens arranged in this order from the object side.

The first and second examples use a lens-fitted photo film unit 2 having the following photographic designs:

f=33.14 mm

FNo=8.0 f1=104.37 mm

ω=34° wherein f is a composite or total focal length of the taking lens 5, f1 is a focal length of the first lens element, FNo is an f-number at open aperture, ω is a half-field angle.

The exposure frame 22a is held curved along its lengthwise direction at a radius of curvature R100 with its concave surface oriented to the object side. Lens data of the film unit 2 is shown in Table 1, wherein surfaces of the first and second lens elements of the taking lens 5 are referred to as first to fourth surfaces in this order from the object side. As indicated by asterisk marks, the image side surface of the first lens element (the second surface), and the image side surface of the second lens element (the fourth surface) are aspherical surfaces that satisfy the following condition:

$$Z=ch^2[1+\sqrt{\{1-(1+K)c^2h^2\}}]+Ah^4+Bh^6+Ch^8+Dh^{10}$$

wherein c is a reciprocal to a radius of curvature, h is a height of a ray from the optical axis 5a, and K, A, B, C, D are aspherical coefficients. The aspherical coefficients for the second and fourth surfaces are shown in Table 2.

TABLE 1

| SURFACE | RADIUS OF CURVATURE | DISTANCE | REFRACTIVE INDEX | DISPERSION |
|---|---|---|---|---|
| 1 | 4.286 | 1.70 | 1.492 | 57.5 |
| 2 | 4.100(*) | 0.82 | | |
| 3 | PLANE | 0.79 | 1.492 | 57.5 |
| 4 | −20.511(*) | 0.15 | | |
| STOP | ∞ | 0.41 | | |

TABLE 2

| COEFFICIENT | SURFACE #2 | SURFACE #4 |
|---|---|---|
| K | −0.66147 | 0.000000 |
| A | 0.208782E−02 | −0.574671E−03 |
| B | 0.174335E−03 | −0.150350E−04 |
| C | 0.000000E+00 | 0.000000E+00 |
| D | 0.000000E+00 | 0.000000E+00 |

Table 3 shows actual measurement values representative of the degrees of distortions of rectilinear lines on the exposure frame 22a as photographed by the above specified film unit 2, with respect to several points on the exposure frame 22a represented by coordinate values, wherein the origin (0, 0) coincides with the intersection of the optical axis 5a of the taking lens 5 with the exposure frame 22a.

TABLE 3

| | X | | | | |
|---|---|---|---|---|---|
| Y | 0° | 7.844° | 15.463° | 22.686° | 29.424° |
| 0° | (0, 0) | (4.50, 0.00) | (9.00, 0.00) | (13.50, 0.00) | (18.00, 0.00) |
| 5.237° | (0, 3) | (4.50, 3.00) | (9.01, 2.98) | (13.51, 2.95) | (18.01, 2.91) |
| 10.362° | (0, 6) | (4.52, 5.99) | (9.03, 5.96) | (13.54, 5.90) | (18.04, 5.82) |
| 15.282° | (0, 9) | (4.53, 8.98) | (9.06, 8.94) | (13.54, 8.85) | (18.08, 8.71) |
| 19.923° | (0, 12) | (4.56, 11.98) | (9.10, 11.91) | (13.63, 11.78) | (18.14, 11.59) |

In Table 3, incident angles of rays on the taking lens 5 and image forming positions of these rays on the exposure frame 22a, as represented by coordinate values, are shown as reference values. The ray whose incident angle is 0° is the ray entering in parallel to the optical axis 5a. The rays incident on the taking lens 5 at angles of 7.844°, 15.463°, 22.686° and 29.424° in the X-axis direction or transverse direction to the optical axis 5a of the taking lens 5 correspond the vertical lines M1, M2, M3 . . . of FIG. 7 respectively, and are focused on the respective positions on the exposure frame 22a. The rays incident on the taking lens at angles of 5.237°, 10.362°, 15.282° and 19.923° in the Y-axis direction or longitudinal direction to the optical axis 5a, correspond to the transverse lines N1, N2, N3 . . . of FIG. 7 respectively, and are focused on the respective positions on the exposure frame 22a. Ideally, those rays entering the taking lens 5 at the same incident angle in the X-axis direction must be focused on those positions whose x-distances are equal, and those rays entering the taking lens 5 at the same incident angle in the Y-axis direction must be focused on those positions whose y-distances are equal. However, as shown in Table 3, the x-distance or the y-distance of the image forming positions of those rays having the same incident angle in the X-axis or the Y-axis direction vary from each other respectively.

EXAMPLE 1

In the first example, only the image correction process for the distortion of the photographed picture by approximating the distortion to circles is carried out, and the correction process for the image magnification change is omitted.

The degree of distortion in the vertical line that corresponds to the incident angle of 29.424° in the X-axis direction is calculated as a radius Rx1 on the basis of two coordinate points (18, 0) and (18.14, 11.59), through a relationship between a radius Rx and line segments Ly and Ld, as shown in FIG. 6. In the same way, the degree of distortion in the vertical line that corresponds to the incident angle of 15.463° in the X-axis direction is calculated as a radius Rx2 on the basis of two coordinate points (9, 0) and (9.10, 11.91). On the other hand, the degree of distortion in the transverse line that corresponds to the incident angle of 19.923° in the Y-axis direction is calculated as a radius Ry1 on the basis of two coordinate points (0, 12) and (18.14, 11.59), and the degree of distortion in the transverse line that corresponds to the incident angle of 10.362° in the Y-axis direction is calculated as a radius Ry2 on the basis of two coordinate points (0, 6) and (18.04, 5.82). The radii Rx1, Rx2, Ry1 and Ry2 obtained in the first example are:

Rx1=479.815

Rx2=709.288

Ry1=−401.497

Ry2=−904.095 wherein the plus or the minus of the radius depends on whether the center of the circle approximating to the distortion of the linear line is on the plus range or the minus range of the ordinate or the abscissa.

The radii derived from the actual measurement values in this way were substituted for the values Rx and Ry of the equation (1) $Rx=\alpha/x^{2n}$, $Ry=\beta/y^{2m}$, to obtain the coefficients $\alpha$, $\beta$, n and m through the method of least square. Table 4 shows the consequent values of the coefficients $\alpha$, $\beta$, n and m.

TABLE 4

|   | Rx1 | Rx2 |   | Ry1 | Ry2 |
|---|---|---|---|---|---|
| Rx | 479.815 | 709.288 | Ry | −401.497 | −904.095 |
| a | 18 | 9 | b | 12 | 6 |
| $\alpha$ | 2448.494 |  | $\beta$ | −7150.939 |  |
| m | 0.2819 |  | n | 0.5771 |  |

Using the above coefficients, the coordinate transformation for correcting the distortions were carried out through the above equations (4) and (5). Results of this coordinate transformation are shown in Table 5, wherein Dx represents the distortions in the transverse lines, Dy represents the distortions in the vertical lines, the upper coordinates of each cell, i.e. those put in parenthesis, represent the position on the exposure frame 22a, whereas the lower coordinates of each cell, i.e. those put in brackets, represent the position after the coordinate transformation.

TABLE 5

| | X | | | | | |
|---|---|---|---|---|---|---|
| Y | 0° | 7.844° | 15.463° | 22.686° | 29.424° | |
| 0° | (0, 0) | (4.50, 0.00) | (9.00, 0.00) | (13.50, 0.00) | (18.00, 0.00) | Dx |
| 5.237° | (0, 3) | (4.50, 3.00) | (9.01, 2.98) | (13.51, 2.95) | (18.01, 2.91) | (0.09) |
|  |  | [4.50, 3.01] | [9.00, 3.00] | [13.50, 3.00] | [18.01, 2.99] | [0.01] |
| 10.362° | (0, 6) | (4.52, 5.99) | (9.03, 5.96) | (13.54, 5.90) | (18.04, 5.82) | (0.18) |
|  |  | [4.50, 6.00] | [9.00, 6.01] | [13.51, 6.00] | [18.00, 6.00] | [0.01] |
| 15.282° | (0, 9) | (4.53, 8.98) | (9.06, 8.94) | (13.54, 8.85) | (18.08, 8.71) | (0.29) |
|  |  | [4.49, 9.00] | [9.00, 9.01] | [13.51, 9.01] | [18.00, 9.00] | [0.01] |
| 19.923° | (0, 12) | (4.56, 11.98) | (9.10, 11.91) | (13.63, 11.78) | (18.14, 11.59) | (0.41) |
|  |  | [4.49, 12.01] | [9.00, 12.01] | [13.51, 12.01] | [18.00, 12.00] | [0.01] |
| Dy |  | (0.06) | (0.1) | (0.13) | (0.14) |  |
|  |  | [0.01] | [0.00] | [0.01] | [0.01] |  |

In the present example, the coordinate transformation is not carried out on those pixels whose x-distance or y-distance is zero, so the coordinates of the transformed positions are omitted for these pixels. As shown in Table 5, the distortions in the vertical and transverse lines were reduced to 0.01 mm or less, as the result of the coordinate transformation, though the distortions were originally 0.06 mm to 0.41 mm. Consequently, the image quality is remarkably improved.

Since the coefficients "m" and "n" are decimals having four digits in the decimal part in the present example:
m=0.2819, n=0.5771, it can take too much time for calculations through the equations (4) and (5) with such coefficients. In order to reduce the operation time, it is possible to substitute a value "$a^{0.45}$" for the value "$a^{2m}=a^{2\times 0.2819}$", and a value "$b^{0.45}$" for the value "$b^{2n}=b^{2\times 0.5771}$" in the above equation (1). It is also possible to substitute previously calculated coefficients Ca $\approx a^{2m}$ and Cb$\approx b^{2n}$ for $a^{2m}$ and $b^{2n}$. Thereby, the time necessary for the operation process is reduced, though the accuracy of the correction is a little lowered.

EXAMPLE 2

In the second example, the image data was subjected to the same distortion correction process was carried out using the same coefficients $\alpha$, $\beta$, m and n as in the first example and, thereafter, to the magnification correction process for compensating for the change in image magnification.

Since the coordinate values shown in Table 3 are determined with reference to the incident angles on the taking lens 5, the locations of the vertical lines and the transverse lines in an ideal image photographed at an ideal image magnification may be calculated through an equation that represents a relationship between an ideal field height H, a paraxial focal length F and the incident angle $\theta$. Although the ideal field height H is generally expressed as H=f×tan $\theta$, since the taking lens 5 used in the present example has the distortion, the following equation (14) is used for calculating the ideal field height H in this example:

$$H=(F-\Delta Z)\times \tan \theta \quad (14)$$

wherein $\Delta Z$ represents a deviation of an image point from a paraxial focal point that is resulted from the aberrations of the taking lens 5.

Table 6 shows deviations of the actual field heights as shown in Table 3, from the ideal field heights H as calculated using the above equation (14), with respect to the pixels on the X-axis and the Y-axis.

TABLE 6

| X | INCIDENT ANGLE | 7.844 | 15.463 | 22.686 | 29.424 |
|---|---|---|---|---|---|
|  | IDEAL FIELD HEIGHT | 4.51 | 9.06 | 13.69 | 18.47 |
|  | ACTUAL FIELD HEIGHT | 4.5 | 9.0 | 13.5 | 18.0 |
| Y | INCIDENT ANGLE | 5.237 | 10.362 | 15.282 | 19.923 |
|  | IDEAL FIELD | 3.00 | 5.99 | 8.95 | 11.87 |

TABLE 6-continued

| | | | | |
|---|---|---|---|---|
| HEIGHT | | | | |
| ACTUAL FIELD HEIGHT | 3.0 | 6.0 | 9.0 | 12.0 |

As seen from the deviations shown in Table 6, the image magnification is lowered in the X-axis or transverse direction, and is enlarged in the Y-axis or vertical direction.

The results shown in Table 6 were substituted for a, a', b and b' in the equations (6) and (7), to obtain the coefficients γ, δ, ε and ζ. The subsequent values are:

$\gamma = 1.011328572$ $\delta = -0.001960436$ $\epsilon = 0.993171494$ $\zeta = 0.00148227$ Using these coefficients, the image data as corrected through the distortion correction process were subjected to the correction process for correcting the image magnification change. Results of the image correction in the second example are shown in Table 7.

TABLE 7

| | | | | | |
|---|---|---|---|---|---|
| X | INCIDENT ANGLE | 7.844 | 15.463 | 22.686 | 29.424 |
| | IDEAL FIELD HEIGHT | 4.51 | 9.06 | 13.69 | 18.47 |
| | ACTUAL FIELD HEIGHT | 4.5 | 9.0 | 13.5 | 18.0 |
| | CALCULATED FIELD HEIGHT (ACCURACY) | 4.52 (0.02) | 9.00 (0.00) | 13.48 (−0.02) | 18.01 (0.01) |
| Y | INCIDENT ANGLE | 5.237 | 10.362 | 15.282 | 19.923 |
| | IDEAL FIELD HEIGHT | 3.00 | 5.99 | 8.95 | 11.87 |
| | ACTUAL FIELD HEIGHT | 3.0 | 6.0 | 9.0 | 12.0 |
| | CALCULATED FIELD HEIGHT (ACCURACY) | 2.99 (−0.01) | 6.00 (0.00) | 9.01 (0.01) | 12.00 (0.00) |

As seen from Table 7, the corrected values obtained through the equations (6) and (7) have errors of not more than 0.02 mm. That means, the change in the image magnification is compensated with high accuracy, providing a high quality image.

Now the image data correction method according to the second embodiment of the present invention will be described with reference to FIGS. 13 to 21, wherein like or equivalent elements are designated by the same reference numerals as used in the first embodiment of the present invention, and the detailed description of these elements are omitted to avoid redundancy. The following description will relate only to those features essential to the second embodiment.

Figure 13:
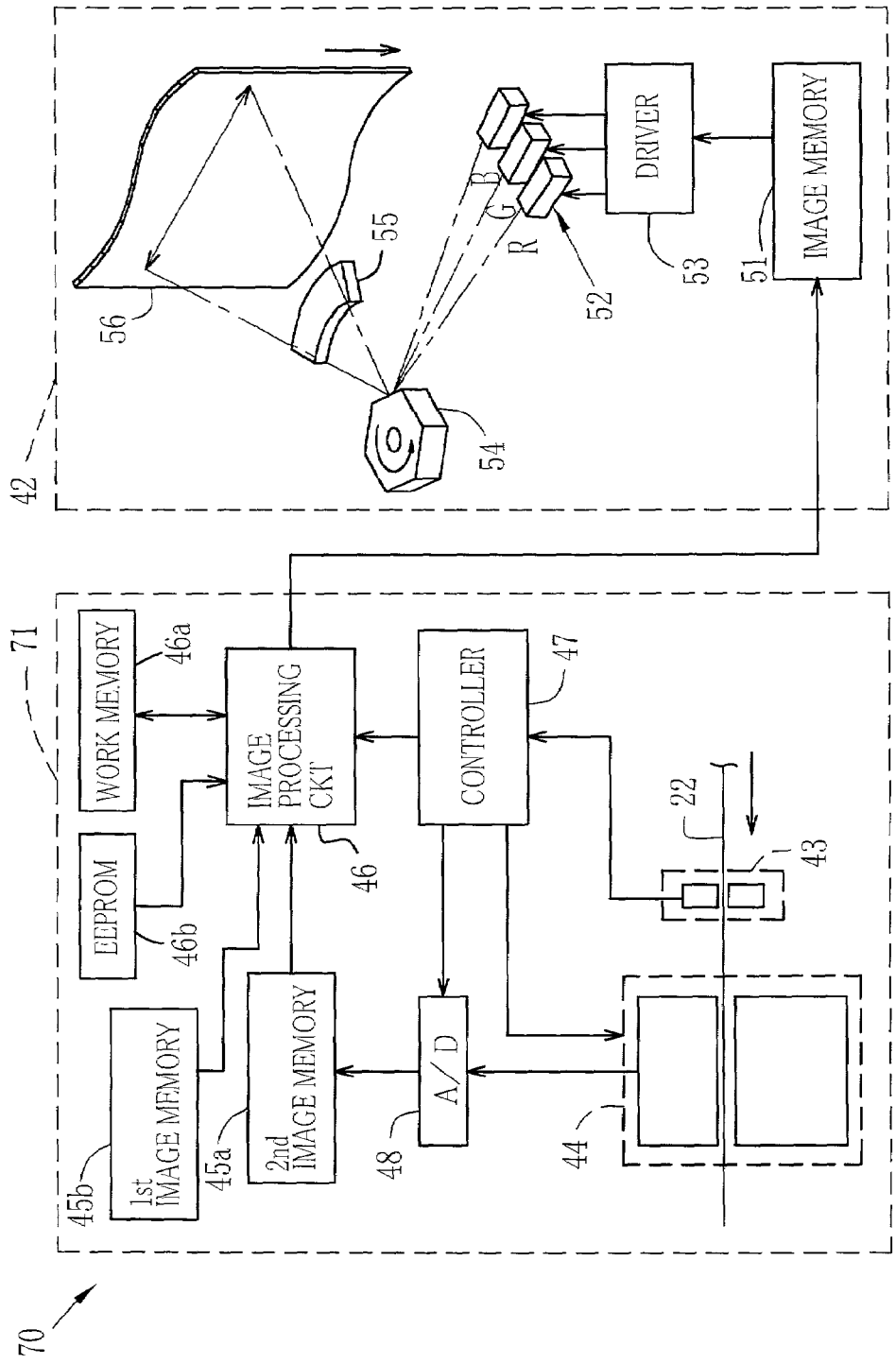
FIG. 13 is a block diagram illustrating a digital printer embodying another image data correction method of the present invention.

FIG. 13 schematically shows a digital printer 70 embodying the method of the present invention. In this digital printer, an image input section 71 is provided with first and second image memories 45a and 45b. Otherwise, fundamental structures of the digital printer 70 are equal to those of the first embodiment.

Three color mage data picked up from an exposure frame 22a of a photo filmstrip 22 through an image scanner 44 is written on the first memory 45a. Thus, the original picture is divided into a large number of pixels, and the image data of these pixels are written in respective memory locations of the first memory 45a that correspond to the positions of the pixels on the exposure frame 22a in one-to-one relationship. It is to be noted that the image data is not to be limited to the three color separation data, but may be luminance data and chromatic data. The second memory 45b also has memory locations that correspond to the positions of the pixels on the exposure frame 22a in one-to-one relationship.

An image processing circuit 46 reads out the image data from the first memory 45a, and processes the image data to correct the image distortions that are resulted from the distortion of a taking lens 5 and the curvature of the exposure frame 22a at the exposure, in the way as set forth in detail later, and then writes the corrected image data on the second image memory 45b, in those memory locations which do not correspond to the original memory locations of the first image memory 45a. Thereafter, the corrected image data is subjected to the ordinary image correction processes, including color correction, negative-to-positive conversion and the like, and then sent to an image printing section 42.

The EEPROM 46b stores different sets of correction parameters Cα, Cβ, Cγ, Lc and Rf for different types of film units. The image processing circuit 46 reads out a corresponding set of the coefficients in accordance with the unit type code read out from the photo filmstrip 22, and carries out the image distortion correction process with these correction parameters Cα, Cβ, Cγ, Lc and Rf for correcting the distortions and the magnification changes of the photographed image. Since the correction parameters are stored in the EEPROM 46b, it is possible to add a new set of correction parameters for a new type film unit to the EEPROM 46b, when the new type lens-fitted photo film unit is brought into the market.

The EEPROM 46b also stores coordinates (Px, Py) representative of ideal positions of pixels of one frame that correspond to ideal image points. The ideal image points mean those image points which are formed on the exposure frame 22a if the taking lens 5 has no distortion and the exposure frame 22a is held flat at the exposure. The coordinates (Px, Py) represent a position to which a respective pixel of the original image is to be rearranged, and may be previously determined by calculations. It is enough for the image distortion correction process of the image data of one frame to prepare the coordinates (Px, Py) for several pixels of one frame, because the corrected image consists of a large number of pixels like the original image read out through the scanner 44.

The image distortion correction process according to the second embodiment will now be described.

Figure 14:
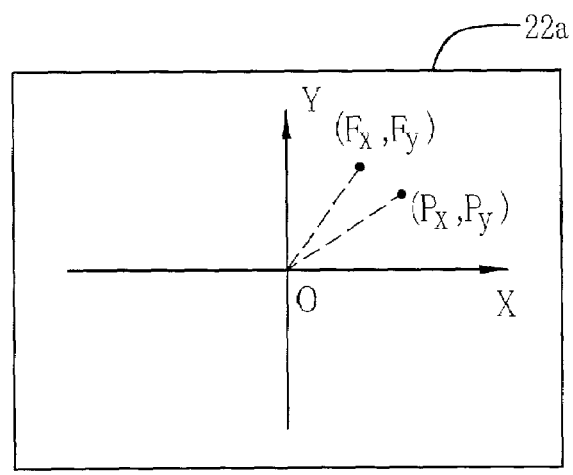
FIG. 14 is an explanatory diagram illustrating a coordinate system for locating respective points in the exposure frame, that is used in an image distortion correction process of the image processing method.

As shown in FIG. 14, the image processing circuit 46 process the image data using a planer coordinate system whose origin O is at a center of the exposure frame 22a, i.e. at an intersection of an optical axis 5a of the taking lens 5, whose abscissa extends in the longitudinal direction of the exposure frame 22a, i.e. the direction of the curvature, and whose ordinate extends in a direction rectangular to the longitudinal direction of the exposure frame 22a. In FIG. 14, a point (Fx, Fy) represents an original position of an appropriate pixel of the image on the exposure frame 22a as being held flat in the image input section 71, hereinafter called an actual image point. On the other hand, a point (Px, Py) represents an ideal position of the corresponding pixel in the exposure frame 22a, hereinafter called an ideal image point.

The image processing circuit 46 produces an LUT that represents a correlation between the coordinate values (Fx, Fy) of the actual image point and the coordinate values (Px, Py) of the ideal image point using the following equations (I) and (II):

$$Fx = Rf \cdot \tan^{-1}\{Wx/(Rf-Wz)\} \tag{I}$$

$$Fy = \{(Lc-Wz) \cdot Dy\}/Lc \tag{II}$$

wherein $$Dx = Px \cdot (1 + C\alpha \cdot \sqrt{H1} + C\beta \cdot H1 + C\gamma \cdot H1^2)$$

$$Dy = Py \cdot (1 + C\alpha \cdot \sqrt{H1} + C\beta \cdot H1 + C\gamma \cdot H1^2)$$

$$H1 = \sqrt{(Px^2 + Py^2)}$$

$$Wx = \{-Dx/(M \cdot Lc)\} \cdot \{N - \sqrt{(N^2 - M \cdot Dx^2)} - M \cdot Lc\}$$

$$Wz = \{N - \sqrt{(N^2 - M \cdot Dx^2)}\}/M$$

$$M = 1 + (Dx^2/Lc^2)$$

$$N = Rf + (Dx^2/Lc)$$

The above equations (I) and (II) are derived from the following theory.

Figure 15:
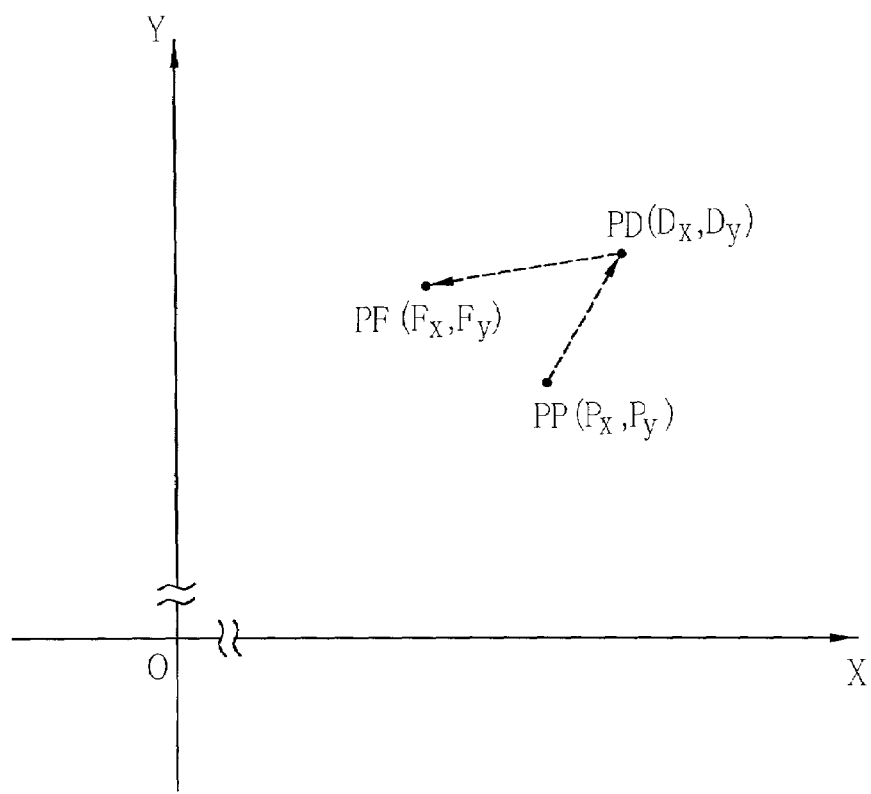
FIG. 15 is an explanatory diagram illustrating displacement of an image point caused by the lens distortion and the curvature of the filmstrip at the exposure.

As shown schematically in FIG. 15, on the assumption that the exposure frame 22a is held flat at the exposure, an image point PD(Px, Py) formed through the taking lens 5 on the flat exposure frame 22a deviates from its ideal image point PP(Px, Py) because of the distortion of the taking lens 5. The distortion Ds of the taking lens 5 may be generally expressed by use of an ideal field height Hi and an actual field height H2: Ds=(H2−H1)/H1. According to a teaching disclosed in a book "*Lens Designing Method*" 1$^{st}$ Edition, page 102, written by Yoshiya MATSUI, published by Kyoritsu Shuppan, the distortion Ds may also be expressed by use of a third-order aberration coefficient V1 and a fifth-order aberration coefficient V2: Ds=−50·{V1·(N1 tan ω)$^2$+(V2/4) (N1 tan ω)$^4$}. In this equation, "N1 tan ω" corresponds to the ideal field height H1, so the position of the image formed through the taking lens 5 on the flat exposure frame 22a, i.e. the respective image points PD as deviating from the respective ideal image points PP due to the distortion of the taking lens 5 may be calculated on the basis of the ideal field height H1, using these equations.

In the present embodiment, the relationship between the ideal image point PP(Px, Py) and the corresponding image point PD(Dx, Dy) is defined by use of the correction parameters Cα, Cβ and Cγ as set forth below:

$$Dx = Px \cdot (1 + C\alpha \cdot \sqrt{H1} + C\beta \cdot H1 + C\gamma \cdot H1^2) \tag{III}$$

$$Dy = Py \cdot (1 + C\alpha \cdot \sqrt{H1} + C\beta \cdot H1 + C\gamma \cdot H1^2) \tag{IV}$$

wherein $H1 = \sqrt{(Px^2 + Py^2)}$.

Where the exposure frame 22a is held forwardly concave at the exposure, like in the film unit 2, for the sake of reducing influence of the curvature of the field, an actual image point PF formed on the concave exposure frame 22a through the taking lens 5 deviates further from the image point PD, as shown in FIG. 15, while the actual image point PF should ideally be located at the ideal image point PP. As a result, when the pixel is picked up through the scanner 44 from the flat exposure frame 22a, the actual location PF of the pixel deviates from its ideal location PP.

Figure 16:
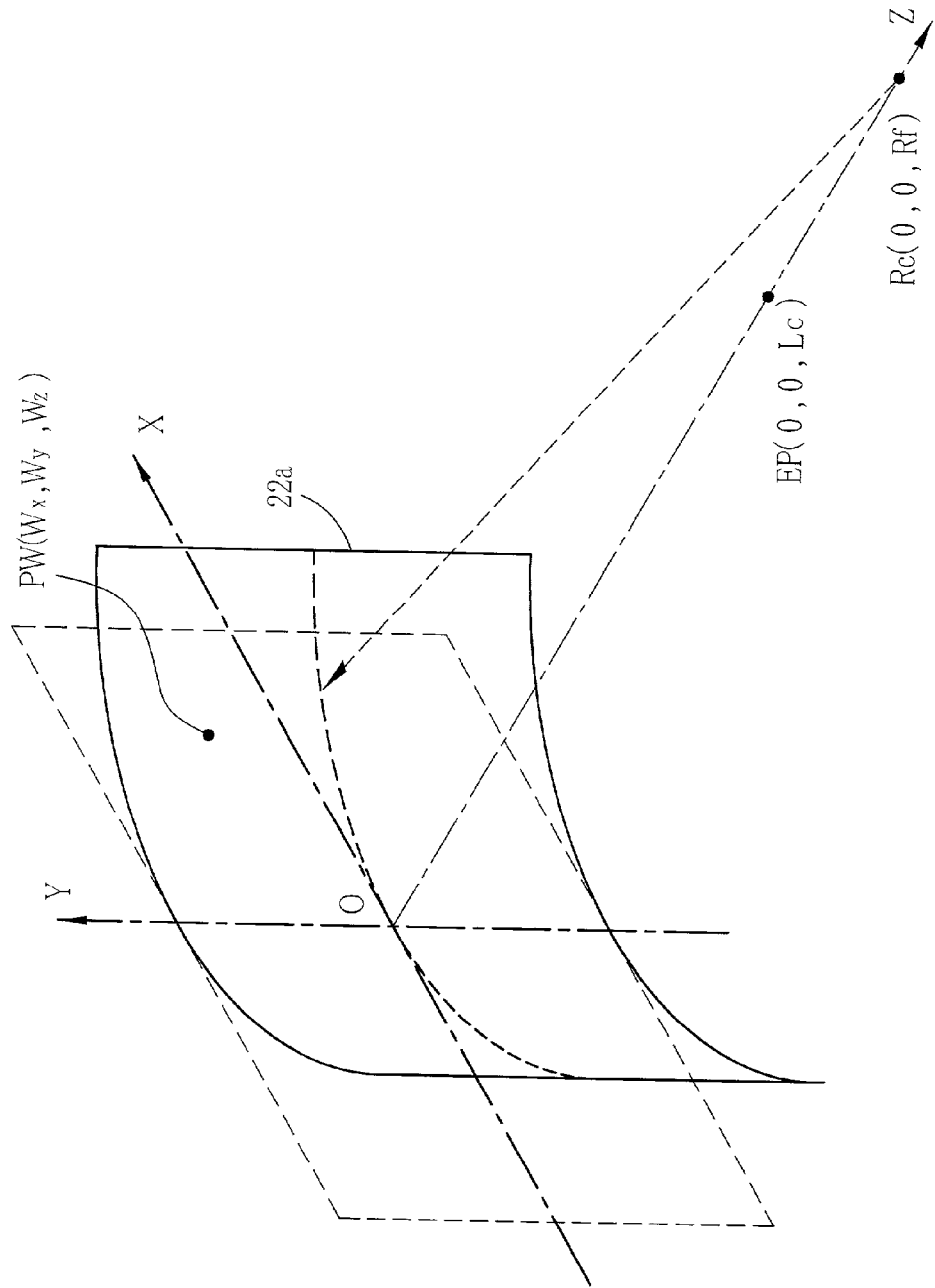
FIG. 16 is an explanatory diagram illustrating an XYZ-coordinate system that shows a relation ship between the filmstrip, a center of curvature of the photo filmstrip, and the center of exit pupil.

FIG. 16 shows an XYZ-coordinate system, wherein the Z-axis represents the optical axis 5a of the taking lens 5, and the origin O represents the intersection of the optical axis 5a with the exposure frame 22a at the exposure. Designated by EP is a center of the exit pupil of the taking lens 5, and is expressed as (0, 0, Lc) in the XYZ-coordinate system. Designated by Rc is a center of curvature of the exposure frame 22a, and is expressed as (0, 0, Rf) in the XYZ-coordinate system. The z-distance "Lc" of the center of the exit pupil EP represents the distance of the center of the exit pupil EP from the origin O, i.e. from the center of the exposure frame 22a. The z-distance "Rf" of the center of curvature Rc is equal to the radius of curvature of the exposure frame 22a. In the following description, the direction as indicated by an arrow in either axis of the XYZ-coordinate system will be referred to as the forward direction.

Figure 17:
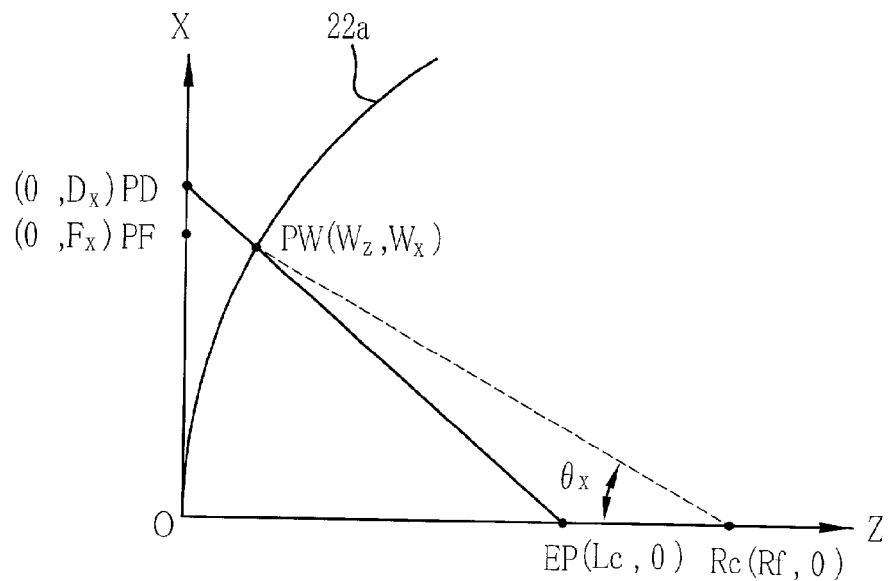
FIG. 17 is an explanatory diagram illustrating a relationship between image points, the center of curvature and the center of exit pupil, relating to those rays having the same incident angle with respect to the X-axis direction.

Assuming that the actual image point PF picked up from the flat exposure frame 22a through the scanner 44 is located at an image point PW when the exposure frame 22a is curved concave at the exposure, and that the image point PW is expressed as (Wx, Wy, Wz) in the XYZ-coordinate system, the relationship between the image points PW, PF and PD, the center Rc of curvature, and the center EP of the exit pupil may be expressed as shown in FIG. 17, when being viewed in the Y-axis direction.

FIG. 17 shows that the x-distance Fx of the actual image point PF is equal to a length of an arc between the origin O and the image point PW, hereinafter called the arch OW, and that corresponds to the curved exposure frame 22a. The length of the arc OW may be derived from coordinates of an intersection between the arch OW and a line segment EP-PD extending from the center EP of the exit pupil to the image point PD. Since the intersection between the arch OW and the line segment EP-PD is equal to the image point PW, the length of the arc OW may be derived from the x-distance Wx and the z-distance Wz of the image point PW.

Concretely, the line segment EP-PD is expressed by the following equation (V), and the arc OW is expressed by the following equation (VI):

$$X = -(Dx/Lc) \cdot Z + Dx \tag{V}$$

$$(Z-Rf)^2 + X^2 = Rf^2 \tag{VI}$$

According to the above equations (V) and (VI), the x-distance Wx and the z-distance Wz of the image point PW are expressed by the following equations (VII) and (VIII). It is to be noted that these equations take account of the fact that the image point PW is located on the side of the origin O from the center EP of the exit pupil.

$$Wx = \{-Dx/(M \cdot Lc)\} \cdot \{N - \sqrt{(N^2 - M \cdot Dx^2)} - M \cdot Lc\} \tag{VII}$$

$$Wz = \{N - \sqrt{(N^2 - M \cdot Dx^2)}\}/M \tag{VII}$$

wherein $M = 1 + (Dx^2/Lc^2)$ and $N = Rf + (Dx^2/Lc)$.

Provided that a line segment Rc-PW extending from the center Rc of the curvature to the image point PW forms an angle θx (radian) to the Z-axis, i.e. the optical axis 5a, the length of the arc OW, i.e. the x-distance Fx of the actual image point PF is expressed as follows:

$$Fx = Rf \cdot \theta x \tag{IX}$$

The angle θx may be expressed by use of the x-distance Wx and the z-distance Wz of the image point PW, which are obtained through the above equations (VIII) and (IX), as well as the z-distance Rf of the center of curvature, as shown in the following equation:

$$i\ \theta x = \tan^{-1}\{Wx/(Rf-Wz)\} \tag{X}$$

According to the equations (IX), (X), the equation (I) for calculating the x-distance Fx of the actual image point PF is provided: $Fx = Rf \cdot \tan^{-1}\{Wx/(Rf-Wz)\}$.

Figure 18:
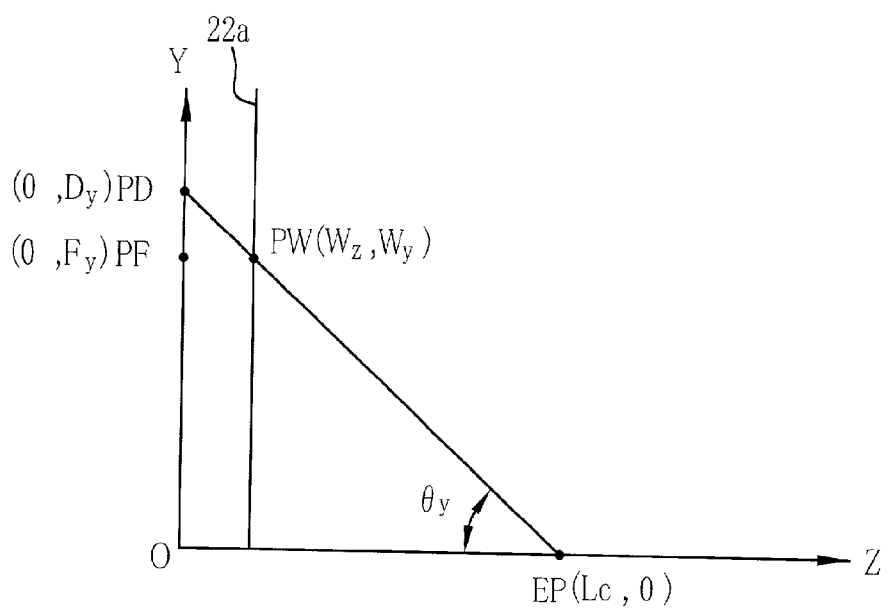
FIG. 18 is an explanatory diagram illustrating a relationship between image points, the center of curvature and the center of exit pupil, relating to those rays having the same incident angle with respect to the Y-axis direction.

On the other hand, FIG. 18 shows a relationship between the image points PW, PF and PD, and the center EP of the exit pupil, as being viewed in the X-axis direction. Provided that a line segment EP-PD extending from the center EP of the exit pupil to the image point PD forms an angle θy to the optical axis 5a (the Z-axis), the following equation (XI) should hold, and the y-distance Wy of the image point PW may be expressed by the following equation (XII) using the angle θy and the z-distance Wz of the image point PW:

$$\tan \theta y = Dy/Lc \quad (XI)$$

$$Wy = (Lc - Wz) \cdot \tan \theta y \quad (XII)$$

Since the exposure frame 22a is curved along its lengthwise direction, i.e. in the X-axis direction, but not in its widthwise direction, i.e. in the Y-axis direction, the y-distance Fy of the actual image point PF is equal to the y-distance Wy of the image point PW: Fy=Wy. Accordingly, the equation (II) for calculating the y-distance Fy of the actual image point PF may be obtained by the equations (XI) and (XII): Wy=Fy={(Lc−Wz)·Dy}/Lc.

Since the values Dx and Dy, and thus the values Wx and Wy may be expressed by use of the coordinates (Px, Py) of the ideal image point PP of the appropriate pixel in combination with the correction parameters Cα, Cβ, Cγ, Rf and Lc, the operation formulas (I), (II) may be used for obtaining a correlation between the actual location of in the exposure frame 22a as expressed by the coordinates (Fx, Fy), on one hand, and the ideal location of that pixel as expressed by the coordinates (Px, Py).

The correction parameters Cα, Cβ and Cγ can be predetermined by calculations using lens data of the taking lens 5 of the film unit 2 or by experiments. Since the correction parameters Rf and Lc represent the radius of curvature of the exposure frame 22a at the exposure, and the distance from the center of the exit pupil of the taking lens 5 to the center of the exposure frame 22a at the exposure, respectively, these values are also predetermined by the dimensions of the film unit 2 and the lens data of the taking lens 5. Accordingly, the correction parameters Cα, Cβ, Cγ, Rf and Lc are predetermined for each type of the film unit, and written on the EEPROM 46b in association with the unit type code specific to the individual film unit type.

The image processing circuit 46 reads out the correction parameters Cα, Cβ, Cγ, Rf and Lc from the EEPROM 46b, and calculates the coordinates (Fx, Fy) of each pixel of one frame by applying the correction parameters and the previously stored coordinates (Px, Py) of the ideal image point of each pixel to the formulas (I) and (II), wherein the values Fx, Fy, Px and Py are real numbers. The subsequent coordinates (Fx, Fy) are written on the work memory 46a in correspondence with the coordinates (Px, Py) which the coordinates (Fx, Fy) originate from, thereby producing the correction LUT.

In the image distortion correction process, the image processing circuit 46 reads out the image data from the first image memory 45a sequentially from one pixel to another, and converts the address of each pixel in the first image memory 45a into XY-coordinates. Regarding the coordinates representative of the address in the first image memory 45a as the coordinates (Fx, Fy), the image processing circuit 46 picks up the coordinates (Px, Py) from the correction LUT of the work memory 46a in correspondence with the coordinates (Fx, Fy). Then, the image processing circuit 46 converts the coordinates (Px, Py) into an address, and writes the image data of the corresponding pixel at that address in the second image memory 45b. Thus, the image data of each pixel of one frame is transferred from the first image memory 45a to the second image memory 45b, while being rearranged into ideal positions of the frame where the influences of the lens distortion and the film curvature onto the photographed image are eliminated.

In the above embodiment, the address in the first memory 45a is converted into the coordinates (Fx, Fy), and the coordinates (Fx, Fy) are converted into the coordinates (Px, Py), and thereafter the coordinates (Px, Py) are converted into the address in the second memory 45b. It is alternatively possible to prepare a lookup table that correlates the address in the first image memory 45a to the address in the second memory 45b in accordance with the correlation between the coordinates (Fx, Fy) and the coordinates (Px, Py). Then the coordinates (Fx, Fy) may directly be converted into the coordinates (Px, Py), saving the time for processing.

Although the above operation formula (I) includes a function "$\tan^{-1}$", this function may be replaced with a function approximating to a simple formula including several constant parameters. Then the operation is still more speeded.

Figure 19:
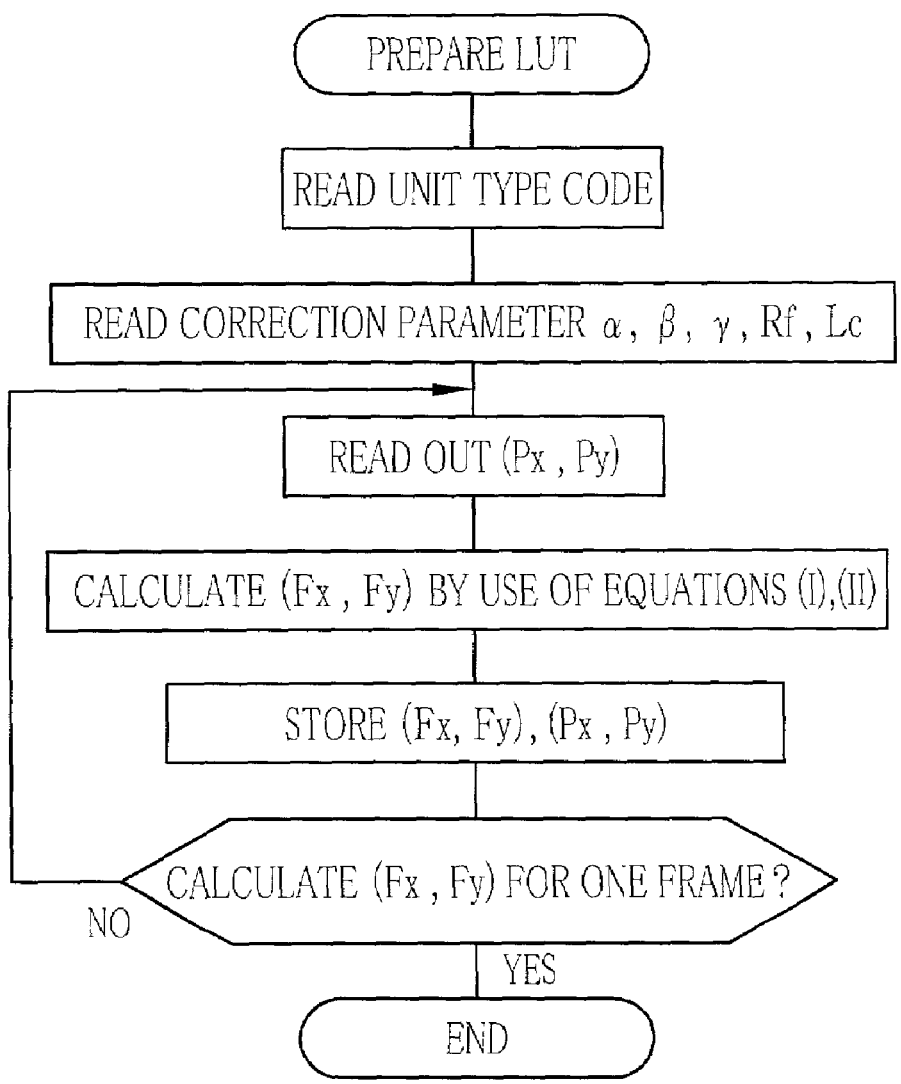
FIG. 19 is a flow chart illustrating a sequence of preparing a correction lookup table for use in an image distortion correction process of the second method.
Figure 20:
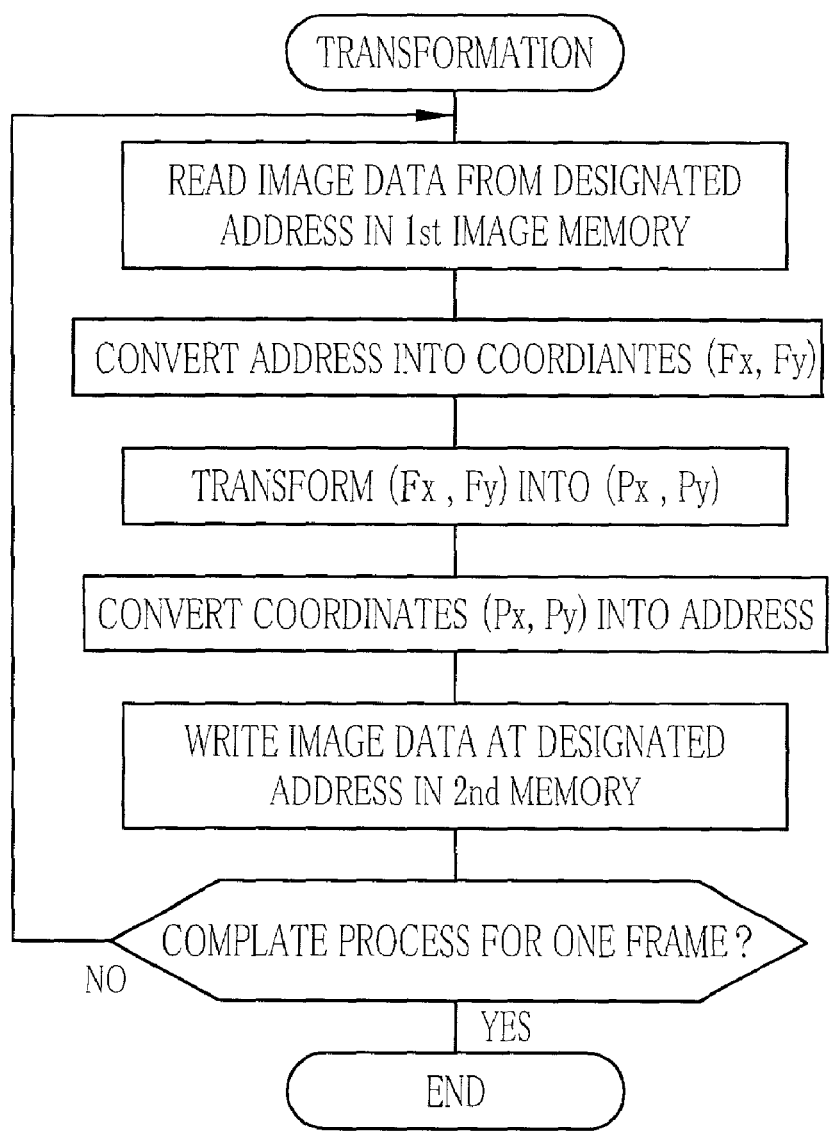
FIG. 20 is a flow chart illustrating a sequence of rearranging pixels of image data picked up from an original.

Now the overall operation of the digital printer 70 according to the second embodiment will be described with reference to FIGS. 19 to 21.

The digital printer 70 advances the photo filmstrip 22 toward the scanner 44. While the photo filmstrip 22 is being advanced, the controller 47 reads out the unit type code on the photo filmstrip 22 through the code reader 43, and sends the unit type code to the image processing circuit 46, as shown in FIG. 19.

Upon receipt of the unit type code, the image processing circuit 46 reads out a corresponding set of the correction parameters Cα, Cβ, Cγ, Lc and Rf from among those stored in the EEPROM 46b. Then, the image processing circuit 46 reads out the coordinates (Px, Py) from the EEPROM 46b, and applies these values Px, Py and the correction parameters Cα, Cβ, Cγ, Lc and Rf to the above operation formulas (I) and (II), to derive the coordinates (Fx, Fy) of one pixel from the coordinates (Px, Py) as being representative of an ideal position of that pixel in the frame. Then the subsequent coordinates (Fx, Fy) and the coordinates (Px, Py) are written on the work memory 46a in correlation to each other, producing the correction LUT.

Since the image distortion is symmetrical about the X-and Y-axes of the exposure frame 22a, it is efficient to carry out the operation using the operation formulas (I) and (II) merely with respect to the first quadrant of the coordinate system, and obtain the correction LUT by modifying the positive or negative sign of the coordinate values about the first quadrant for the second to fourth quadrants. Instead of storing the coordinates (Px, Py) of the ideal image points previously in the EEPROM 46b, it is possible to carry out the above operation for obtaining the correction LUT while gradually changing the coordinates (Px, Py) by a given increment or decrement that is defined by the pixel interval.

After the correction LUT is thus produced in the work memory 46a, a color picture recorded in the exposure frame 22a is read out through the scanner 44, and is converted into three color image data through an A/D converter 48. The three color image data is written on the first image memory 45a. When the original image data of the entire exposure frame 22a has been written on the first image memory 45a, the image processing circuit 46 reads out the original image data one pixel after another in a predetermined sequence while addressing the memory location of the first image memory 45a, as shown in FIG. 20.

Each time the image processing circuit 46 reads out the image data of one pixel from the first image memory 45a, the coordinates (Fx, Fy) representative of the address of that pixel in the first memory 45a is converted into the coordinates (Px, Py) by use of the correction LUT as prepared and stored in the work memory 46a, and then the image processing circuit 46 writes the image data on the second image memory 45b at an address representative of the coordinates (Px, Py).

Figure 21:
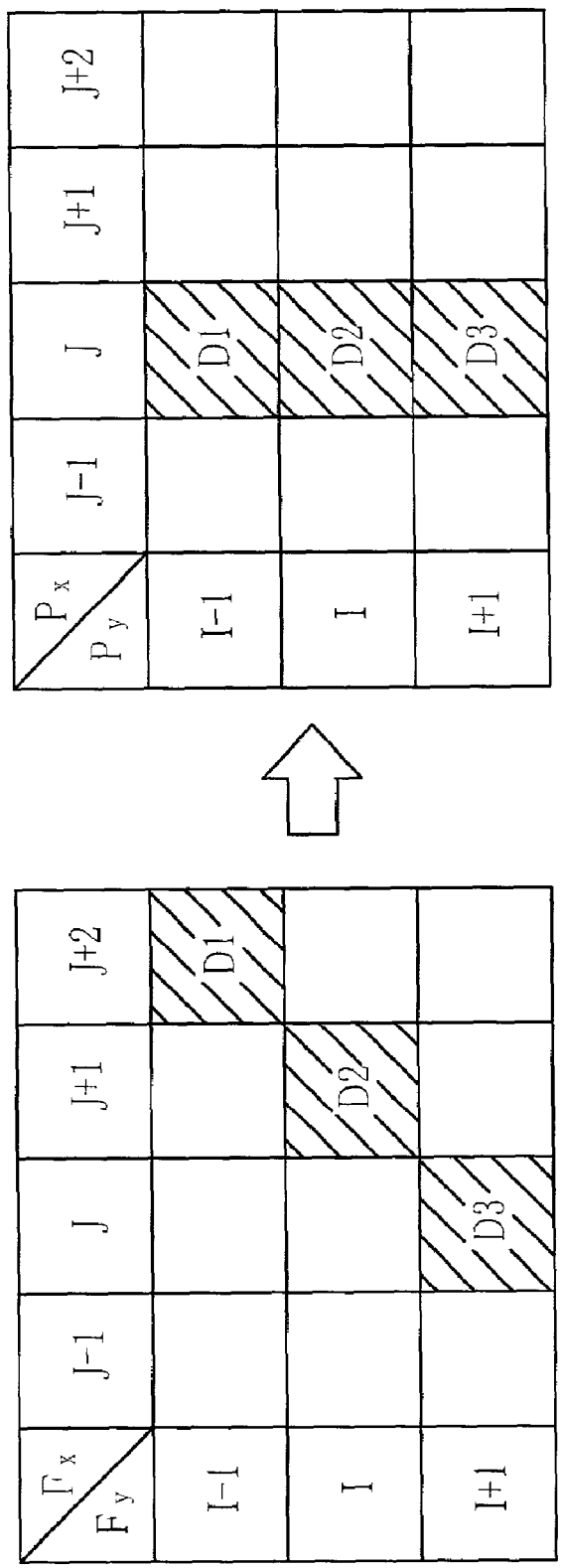
FIG. 21 is an explanatory diagram illustrating a relationship between image data before and after the rearrangement.

In this way, the image data of one pixel is rearranged from its original position on the exposure frame 22a that is represented by coordinates (Fx, Fy), to an ideal position that is represented by coordinates (Px, Py), as shown for example in FIG. 21, wherein the image data D1, D2 and D3 of those pixels whose original positions are represented by coordinates (J+2, I−1), (J+1, I) and (J, I+1) are written as corrected image data of those pixels whose positions are represented by coordinates (J, I−1), (J, I) and (J, I+1) respectively. Although the example shown in FIG. 21 relates to a case where the coordinate transformation is carried out only in the X-axis direction, the coordinate transformation may also be carried out in the Y-axis direction.

Thus, the image data written on the second image memory 45b is corrected in view of the image distortion of the original image data. After the image distortion correction process, the corrected image data, as written on the work memory 46a, is subjected to ordinary image processing, such as color correction and negative-positive reversion process. Thereafter, the image processing circuit 46 writes the corrected image data on an image memory 51 of the image printing section 42.

The image printing section 42 prints the color picture as a latent image on the color photographic paper 56, while driving a laser unit 52 on the basis of the corrected three color image data of one frame as written on the image memory 51.

After the color picture of one frame starts being printed, the next exposure frame 22a is placed in the scanner 44, and the correction process is executed in the same procedure as above. It is to be noted that the same LUT as produced initially with reference to the unit type code of the photo filmstrip 22 is used for the correction process of the next and following exposure frames 22a of the same photo filmstrip 22. After the correction process is accomplished on the entire image data of the next frame, the corrected image data is subjected to the ordinary image processing, and then written on the image memory 51 of the image printing section 42. After the printing of the preceding color picture is completed, the next color picture is printed on the color photographic paper 56 on the basis of the corrected image data.

In this way, image data is picked up from the respective exposure frames 22a of the photo filmstrip 22, and is subjected to the correction process and the ordinary image processing, so color pictures are printed on color photographic paper 56 on the basis of the corrected image data.

After having the color pictures printed thereon, the color photographic paper 56 is forwarded to the photographic processing section, where the color photographic paper 56 is developed, fixed and dried, and then cut into the individual pictures, which are ejected as photo-prints from the digital printer 70. Since the pictures are printed on the basis of the image data that is corrected in the way to compensate for the distortion of the original picture while taking account of the curvature of the film surface at the exposure, the image quality of the printed pictures is well improved.

EXEMPLIFICATION

Now the image data correction method of the second embodiment of the present invention will be described with reference to numerical data obtained from an example. In the following description, the same reference numerals will be used for designating the same or equivalent parts of the examples as used in the above embodiment as illustrated in the drawings. In this example, the taking lens 5 is composed of two lens elements, i.e. a first lens and a second lens arranged in this order from the object side, and the first and second examples use a lens-fitted photo film unit 2 having the following photographic designs:

f=33.14 mm

FNo=8.0 f1=104.37 mm

ω=34° wherein f is a composite or total focal length of the taking lens 5, f1 is a focal length of the first lens element, FNo is an f-number at open aperture, ω is a half-field angle.

The exposure frame 22a is held curved along its lengthwise direction at a radius of curvature R100 with its concave surface oriented to the object side.

Lens data of the film unit 2 is shown in Table 8, wherein surfaces of the first and second lens elements of the taking lens 5 are referred to as first to fourth surfaces in this order from the object side, and a numerical value shown in the column "distance" with respect to the image surface represents a deviation of a paraxial focal position from an optimum focal position, and indicates that the film surface is located in the optimum focal position. As indicated by asterisk marks, the image side surface of the first lens element (the second surface), and the image side surface of the second lens element (the fourth surface) are aspherical surfaces that satisfy the following condition:

$$Z=ch^2[1+\sqrt{\{1-(1+K)c^2h^2\}}]+Ah^4+Bh^6+Ch^8+Dh^{10}$$

wherein c is a reciprocal to a radius of curvature, h is a height of a ray from the optical axis 5a, and K, A, B, C, D are aspherical coefficients. The aspherical coefficients for the second and fourth surfaces are shown in Table 9.

TABLE 8

| SURFACE | RADIUS OF CURVATURE | DISTANCE | REFRACTIVE INDEX | DISPERSION |
|---|---|---|---|---|
| 1 | 4.286 | 1.70 | 1.492 | 57.5 |
| 2 | 4.100(*) | 0.82 | | |
| FLARE STOPPER | ∞ | 0.17 | | |
| STOP | ∞ | 0.41 | | |
| 3 | PLANE | 0.79 | 1.492 | 57.5 |
| 4 | −20.511(*) | 0.15 | | |
| FLARE STOPPER | ∞ | 28.316 | | |
| IMAGE SURFACE | | −0.392 | | |

TABLE 9

| COEFFICIENT | SURFACE #2 | SURFACE #4 |
|---|---|---|
| K | −0.66147 | 0.000000 |
| A | 0.208782E−02 | −0.574671E−03 |

TABLE 9-continued

| COEFFICIENT | SURFACE #2 | SURFACE #4 |
|---|---|---|
| B | 0.174335E−03 | −0.150350E−04 |
| C | 0.000000E+00 | 0.000000E+00 |
| D | 0.000000E+00 | 0.000000E+00 |

Degrees of distortions in images photographed by the lens-fitted photo film unit 2 designed as above were investigated through ray tracing. The results are shown in Table 10 by use of incident angles $\theta 1$ and $\theta 2$ of several rays onto the taking lens 5 relative to the optical axis 5a, and coordinates of image points of these rays. It is to be noted that the numerical coordinates values shown in Tables are rounded to the third decimal place.

TABLE 10

| | $\theta 1$ | | |
|---|---|---|---|
| $\theta 2$ | 0.000° | 7.844° | 15.463° |
| 0.000° | (0, 0) | (4.500, 0.000) | (9.000, 0.000) |
| 5.237° | (0, 3.000) | (4.504, 2.955) | (9.006, 2.980) |
| 10.36° | (0, 6.000) | (4.515, 5.989) | (9.026, 5.958) |
| 15.28° | (0, 9.000) | (4.531, 8.984) | (9.058, 8.935) |
| 19.92° | (0, 12.000) | (4.554, 11.978) | (9.100, 11.907) |

| | $\theta 1$ | |
|---|---|---|
| $\theta 2$ | 22.686° | 29.424° |
| 0.000° | (13.500, 0.000) | (18.000, 0.000) |
| 5.237° | (13.509, 2.953) | (18.010, 2.911) |
| 10.36° | (13.535, 5.902) | (18.037, 5.816) |
| 15.28° | (13.580, 8.850) | (18.080, 8.711) |
| 19.92° | (13.680, 11.782) | (18.135, 11.590) |

In Table 10, the angle $\theta 1$ represents an angle of an incident ray to the optical axis 5a in the ZX-plane of the above mentioned ZXY-coordinate system, wherein the Z-axis corresponds to the optical axis 5a. The angle $\theta 2$ represents an angle of an incident ray to the optical axis 5a in the ZY-plane of the ZXY-coordinate system. The respective coordinates represent actual image points PF(Fx, Fy) of these rays on the exposure frame 22a as being held flat, in the unit of millimeter (mm).

The x-distance Fx of those incident rays having the same incident angle $\theta 1$ should ideally be the same as the x-distance Px of the ideal image point for that incident angle $\theta 1$, independently of the change in the angle $\theta 2$. Similarly, the y-distance Fy of those incident rays having the same incident angle $\theta 2$ should ideally be the same as the y-distance Py of the ideal image point for that incident angle $\theta 2$, independently of the change in the angle $\theta 1$.

In the present example, the x-distances Px of the ideal image points PP for the incident angles $\theta 1$ of "0°", "7.844°", "15.463°", "22.686" and "29.424°" are respectively "0", "4.512", "9.06", "13.690" and "18.472" (mm). The y-distances Py of the ideal image points PP for the incident angles $\theta 2$ of "0°", "5.237°", "10.36°", "15.28°" and "19.92°" are respectively "0", "3.002", "5.988", "8.948" and "11.870" (mm).

As shown in Table 10, however, the coordinates (Fx, Fy) differ from the coordinates (Px, Py) of the ideal image points because of the distortions of the taking lens 5 and the curvature of the exposure frame 22a at the exposure.

The correction parameters $C\alpha$, $C\beta$, $C\gamma$, Lc and Rf for the lens-fitted photo film unit of this example were determined as shown in Table 11, and the coordinates (Px, Py), (Dx, Dy) and (Fx, Fy) were calculated by use of the above operation formulas (I), (II), (III) and (IV) with respect to the respective incident angles $\theta 1$ and $\theta 2$ as shown in Table 10. The results of the calculation are shown in Table 12.

TABLE 11

| $C\alpha$ | −0.004 |
|---|---|
| $C\beta$ | 0.002 |
| $C\gamma$ | 2.19731E−05 |
| Lc | 31.209 |
| Rf | 100.000 |

TABLE 12

| | (Px, Py) | (Dx, Dy) | (Fx, Fy) |
|---|---|---|---|
| | | $\theta 1$ | |
| $\theta 2$ | 0.000° | 0.000° | 0.000° |
| 0.000° | (0.000, 0.000) | (0.000, 0.000) | (0.000, 0.000) |
| 5.237° | (0.000, 3.002) | (0.000, 2.998) | (0.000, 2.998) |
| 10.36° | (0.000, 5.988) | (0.000, 5.998) | (0.000, 5.998) |
| 15.28° | (0.000, 8.947) | (0.000, 8.999) | (0.000, 8.999) |
| 19.92° | (0.000, 11.870) | (0.000, 11.992) | (0.000, 11.992) |
| | | $\theta 1$ | |
| $\theta 2$ | 7.844° | 7.844° | 7.844° |
| 0.000° | (4.512, 0.000) | (4.512, 0.000) | (4.499, 0.000) |
| 5.237° | (4.512, 3.002) | (4.516, 3.005) | (4.503, 2.955) |
| 10.36° | (4.512, 5.988) | (4.528, 6.010) | (4.515, 5.990) |
| 15.28° | (4.512, 8.948) | (4.545, 9.013) | (4.531, 8.984) |
| 19.92° | (4.512, 11.870) | (4.565, 12.009) | (4.551, 11.969) |
| | | $\theta 1$ | |
| $\theta 2$ | 15.463° | 15.463° | 15.463° |
| 0.000° | (9.060, 0.000) | (9.112, 0.000) | (9.006, 0.000) |
| 5.237° | (9.060, 3.002) | (9.119, 3.021) | (9.013, 2.982) |
| 10.36° | (9.060, 5.988) | (9.138, 6.040) | (9.031, 5.961) |
| 15.28° | (9.060, 8.948) | (9.166, 9.053) | (9.508, 8.935) |
| 19.92° | (9.060, 11.870) | (9.202, 12.057) | (9.093, 11.897) |
| | | $\theta 1$ | |
| $\theta 2$ | 22.686° | 22.686° | 22.686° |
| 0.000° | (13.690, 0.000) | (13.874, 0.000) | (13.510, 0.000) |
| 5.237° | (13.690, 3.002) | (13.882, 3.044) | (13.518, 2.955) |
| 10.36° | (13.690, 5.988) | (13.906, 6.083) | (13.539, 5.904) |
| 15.28° | (13.690, 8.948) | (13.943, 9.113) | (13.573, 8.845) |
| 19.92° | (13.690, 11.870) | (13.991, 12.131) | (13.618, 11.771) |
| | | $\theta 1$ | |
| $\theta 2$ | 29.424° | 29.424° | 29.424° |
| 0.000° | (18.472, 0.000) | (18.891, 0.000) | (18.010, 0.000) |
| 5.237° | (18.472, 3.002) | (18.901, 3.072) | (18.018, 2.912) |
| 10.36° | (18.472, 5.988) | (18.928, 6.136) | (18.042, 5.817) |
| 15.28° | (18.472, 8.948) | (18.973, 9.191) | (18.080, 8.711) |
| 19.92° | (18.472, 11.870) | (19.032, 12.230) | (18.131, 11.588) |

In the calculation using the formula (I), a function approximating the function "$\tan^{-1}$" is defined as "$f(\sigma) = C\delta \cdot \sigma + C\epsilon \cdot \sigma^3$", wherein $\sigma = \tan(s)$, $C\delta$ and $C\epsilon$ are optimized constant parameters. In the present example, $C\delta = 0.9993935$, and $C\epsilon = -0.3086605$. Table 13 shows accuracy of interpolation using the optimized approximating function. As seen from Table 13, the accuracy of calculation results obtained through the approximating function is sufficiently high.

TABLE 13

| ANGLE | RADIAN(s) | σ = Tan(s) | f(σ) | \|s − f(σ)\| |
|---|---|---|---|---|
| 0° | 0.0000 | 0.0000 | 0.0000 | 0.00 |
| 1° | 0.0175 | 0.0175 | 0.0174 | 1.046E-05 |
| 2° | 0.0349 | 0.0349 | 0.0349 | 2.014E-05 |
| 3° | 0.0524 | 0.0524 | 0.0523 | 2.831E-05 |
| 4° | 0.0698 | 0.0699 | 0.0698 | 3.431E-05 |
| 5° | 0.0873 | 0.0875 | 0.0872 | 3.756E-05 |
| 6° | 0.1047 | 0.1051 | 0.1047 | 3.765E-05 |
| 7° | 0.1222 | 0.1228 | 0.1221 | 3.342E-05 |
| 8° | 0.1396 | 0.1405 | 0.1396 | 2.756E-05 |
| 9° | 0.1571 | 0.1584 | 0.1571 | 1.762E-05 |
| 10° | 0.1745 | 0.1763 | 0.1745 | 5.032E-05 |
| 11° | 0.1920 | 0.1944 | 0.1920 | 9.267E-05 |
| 12° | 0.2094 | 0.2126 | 0.2095 | 2.395E-05 |
| 13° | 0.2269 | 0.2309 | 0.2269 | 3.720E-05 |
| 14° | 0.2443 | 0.2493 | 0.2444 | 4.665E-05 |
| 15° | 0.2618 | 0.2679 | 0.2618 | 4.931E-05 |
| 16° | 0.2793 | 0.2867 | 0.2793 | 4.149E-05 |
| 17° | 0.2967 | 0.3057 | 0.2967 | 1.868E-05 |
| 18° | 0.3142 | 0.3249 | 0.3141 | 2.452E-05 |
| 19° | 0.3316 | 0.3443 | 0.3315 | 9.454E-05 |
| 20° | 0.3491 | 0.3640 | 0.3489 | 1.990E-04 |

Table 14 shows the relationship between the coordinates as shown in Table 10 which are obtained by ray tracing, and the coordinates (Fx, Fy) as shown in Table 12 which are obtained by calculation. The numerical values of errors shown in Table 14 were calculated as absolute values ΔX and ΔY by use of the coordinates obtained by ray tracing and the coordinates (Fx, Fy) before the rounding, and thereafter rounded to the third decimal place, so the absolute values AX and AY include rounding error.

TABLE 14

|  | (Fx, Fy) | RESULT OF RAY TRACING | ERROR ΔX | ERROR ΔY |
|---|---|---|---|---|
| θ2 \\ θ1 | 0.000° | 0.000° | 0.000° | 0.000° |
| 0.000° | (0.000, 0.000) | (0.000, 0.000) | 0.000 | 0.000 |
| 5.237° | (0.000, 2.998) | (0.000, 3.000) | 0.000 | 0.002 |
| 10.36° | (0.000, 5.998) | (0.000, 6.000) | 0.000 | 0.001 |
| 15.28° | (0.000, 8.999) | (0.000, 9.000) | 0.000 | 0.001 |
| 19.92° | (0.000, 11.992) | (0.000, 12.000) | 0.000 | 0.008 |
| θ2 \\ θ1 | 7.844° | 7.844° | 7.844° | 7.844° |
| 0.000° | (4.499, 0.000) | (4.500, 0.000) | 0.001 | 0.000 |
| 5.237° | (4.503, 2.955) | (4.504, 2.995) | 0.001 | 0.000 |
| 10.36° | (4.515, 5.990) | (4.515, 5.989) | 0.000 | 0.001 |
| 15.28° | (4.531, 8.984) | (4.531, 8.984) | 0.000 | 0.000 |
| 19.92° | (4.551, 11.969) | (4.554, 11.978) | 0.003 | 0.009 |
| θ2 \\ θ1 | 15.463° | 15.463° | 15.463° | 15.463° |
| 0.000° | (9.006, 0.000) | (9.00, 0.000) | 0.006 | 0.000 |
| 5.237° | (9.013, 2.982) | (9.006, 2.980) | 0.007 | 0.002 |
| 10.36° | (9.031, 5.961) | (9.026, 5.958) | 0.005 | 0.003 |
| 15.28° | (9.508, 8.935) | (9.058, 8.935) | 0.000 | 0.000 |
| 19.92° | (9.093, 11.897) | (9.100, 11.907) | 0.007 | 0.010 |
| θ2 \\ θ1 | 22.686° | 22.686° | 22.686° | 22.686° |
| 0.000° | (13.510, 0.000) | (13.500, 0.000) | 0.010 | 0.000 |
| 5.237° | (13.518, 2.955) | (13.509, 2.953) | 0.009 | 0.002 |
| 10.36° | (13.539, 5.904) | (13.535, 5.902) | 0.004 | 0.002 |
| 15.28° | (13.573, 8.845) | (13.580, 8.850) | 0.007 | 0.005 |
| 19.92° | (13.618, 11.771) | (13.630, 11.782) | 0.012 | 0.011 |
| θ2 \\ θ1 | 29.424° | 29.424° | 29.424° | 29.424° |
| 0.000° | (18.010, 0.000) | (18.000, 0.000) | 0.010 | 0.000 |
| 5.237° | (18.018, 2.912) | (18.010, 2.911) | 0.008 | 0.001 |
| 10.36° | (18.042, 5.817) | (18.037, 5.816) | 0.005 | 0.002 |
| 15.28° | (18.080, 8.711) | (18.080, 8.711) | 0.000 | 0.000 |
| 19.92° | (18.131, 11.588) | (18.135, 11.590) | 0.004 | 0.002 |

As seen from Table 14, the differences between the coordinates (Fx, Fy) obtained through the formulas (I) and (II), and the coordinates obtained through ray tracing are at most 0.012 mm, so the distortions in the photographed image are corrected with high accuracy.

Although the unit type code representative of the type of the film unit is optically printed as a latent image on the lateral side of the photo filmstrip before the photo filmstrip is loaded in the film unit in the above embodiment, it is possible to provide the unit type code on the periphery of the photo film cartridge, so that the unit type code may be manually or mechanically read out form the photo film cartridge and entered in the image processing section. Instead of the unit type code, any code or indicia is usable insofar as it identifies the suitable correction parameters. It is also possible to print a correction code that represents the correction parameters optically on marginal portions of the photo filmstrip, or as a mechanically readable code on the periphery of the cartridge. If the photo filmstrip is of IX240 type having a transparent magnetic recording layer, the unit type code or correction code may be recorded magnetically on the recording layer.

In case of using the correction codes, the same correction code may be used for different types of film units if the same correction parameters are applicable to these film unit types. The correction parameters themselves may be used as the correction code. As the correction code, merely a command for executing the correction process at the printing is usable. In that case, the distortion correction process is executed using predetermined correction parameters upon the correction code being read out.

The image correction method of the present invention is also applicable to a case where the pictures are photographed by an ordinary camera, especially where the photo filmstrip is held curved at the exposure. In that case, it is possible to provide the camera with a device for recording the correction code on the magnetic recording layer of the photo filmstrip when the camera is for the IX240 type film. Even to those pictures photographed on ISO 135 type photo filmstrips by the ordinary cameras, the image data correction method of the present invention is applicable if only the correction parameters for those cameras are prepared and stored in association with the camera types or correction codes allocated to the respective camera types, and the photographer informs the photofinisher of the camera type.

The present invention is also applicable not only to a digital photographic printer, but also to other types of digital printers and a separate image correcting device as well.

Thus, the present invention is not to be limited to the above embodiments but, on the contrary, various modifications will be possible to those skilled in the art without departing from the scope of claims appended hereto.

What is claimed is:

1. An image data correction method for correcting image data picked up from an original image photographed in an exposure frame on a photographic film through a taking lens while holding the exposure frame curved along a direction of the exposure frame, so as to eliminate image distortion in the original image, said image data correction method comprising the steps of:

setting up an orthogonal coordinate system having an origin at an intersection between an optical axis of the taking lens and the exposure frame, the X-axis of said coordinate system extending in the curved direction of the exposure frame, and the Y-axis of said coordinate system extending perpendicularly to the optical axis of the taking lens;

approximating distortion in an image obtained by photographing straight-linear lines extending in the X-axis and Y-axis directions through the taking lens to circular arcs, wherein distortion in a first straight-linear line extending in the Y-axis direction is approximated to a circular arc which have a center of curvature on the X-axis and passing across an intersection of said first straight-linear line with the X-axis, and distortion in a second straight-linear line extending in the X-axis direction is approximated to a circular arc which have a center of curvature on the Y-axis and passing across an intersection of said second straight-linear line with the Y-axis, said circular arcs having different radii depending upon distances of said respective straight-linear lines from the origin; and rearranging the image data of respective pixels of the original image by transforming coordinates (x, y) of each pixel to coordinates (a, b), wherein "a" represents an x-distance of an intersection between the X-axis and one of said approximating circular arcs that has its center on the X-axis and passes across said coordinates (x, y), and "b" represents a y-distance of an intersection between the Y-axis and one of said approximating circular arcs that has its center on the Y-axis and passes across said coordinates (x, y).

2. An image data correction method as recited in claim 1, wherein the approximating circular arcs are expressed by the following equations, and said coordinates (a, b) are calculated by use of these equations:

$$Rx^2 = \{x-(a+Rx)\}^2 + y^2;$$

$$Ry^2 = x^2 + \{y-(b+Ry)\}^2;$$

$$Rx = \alpha/a^{2n}; \text{ and}$$

$$Ry = \beta/b^{2m},$$

wherein Rx represents a radius of the approximating circular arc having the center on the X-axis, Ry represents a radius of the approximating circular arc having the center on the Y-axis, and $\alpha$, $\beta$, n and m represent coefficients predetermined in accordance with the distortion of the taking lens.

3. An image data correction method as recited in claim 2, further comprising the steps of:

substituting the value "x" for the value "a" if the absolute value |x| is less than a given small value, without carrying out the calculation according to the equations;

substituting the value "y" for the value "b" if the absolute value |y| is less than a given small value, without carrying out the calculation according to the equations; and calculating the value "a" or "b" by use of said equations respectively if the absolute value |x| or |y| is not less than the given small value.

4. An image data correction method as recited in claim 2, wherein said coordinates (a, b) are transformed to coordinates (a', b') by use of the following equations, so as to eliminate influence of change in image magnification that is resulted from the curvature of the exposure frame at the exposure:

$$a = \gamma a' + \delta a'^2; \text{ and}$$

$$b = \epsilon b' + \zeta b'^2,$$

wherein $\gamma$, $\delta$, $\epsilon$ and $\zeta$ are proportional coefficients.

5. An image data correction method as recited in claim 4, wherein the coefficients $\alpha$, $\beta$, n, m, $\gamma$, $\delta$, $\epsilon$ and $\zeta$ are experimentally predetermined according to the types of cameras, including lens-fitted photo film unit, stored in a memory in association with respective camera types, and read out from said memory in accordance with the camera type used for photographing the original image.

6. An image data correction method as recited in claim 5, wherein correlation between said coordinates (a', b') and said coordinates (x, y) is detected with respect to the entire exposure frame in accordance with the camera type, and is written as a lookup table in a memory, and wherein the image data of the respective pixels of the original image are rearranged from said coordinates (x, y) to coordinates (a', b') by use of said lookup table.

7. An image data correction method as recited in claim 2, wherein said coordinates (a, b) are calculated by use of said equations with respect to the first quadrant of said coordinate system, and are derived with respect to the second to fourth quadrant of said coordinate system from the values "a" and "b" obtained with respect to the first quadrant.

8. An image data correction method for correcting image data picked up from an original image photographed in an exposure frame on a photographic film through a taking lens while holding the exposure frame curved along a direction to be concave toward the taking lens, so as to eliminate image distortion in the original image, said image data correction method comprising the steps of:

obtaining a correlation between actual locations and ideal locations of respective pixels of the image data on the original image by calculating an actual location of each pixel on the basis of an ideal location of said pixel and correction parameters, said ideal location corresponding to an ideal image point of said pixel formed on a flat exposure frame through an ideal taking lens having no distortion, and said correction parameters being predetermined in accordance with the distortion of the taking lens and the curvature of the exposure frame at the exposure; and rearranging the image data by transforming each pixel to its ideal location in accordance with said correlation.

9. An image data correction method as recited in claim 8, wherein said actual and ideal locations of the respective pixels in the exposure frame are represented by coordinates of an orthogonal coordinate system having an origin at an intersection between an optical axis of the taking lens and the exposure frame, the X-axis of said coordinate system extending in the curved direction of the exposure frame, and the Y-axis of said coordinate system extending perpendicularly to the optical axis of the taking lens; and said correlation between said actual locations and said ideal locations are obtained by use of the following equations:

$Fx = Rf \cdot \tan^{-1}\{Wx/(Rf-Wz)\};$ $Fy = \{(Lc-Wz) \cdot Dy\}/Lc;$ $Dx = Px \cdot (1 + C\alpha \cdot \sqrt{H1} + C\beta \cdot H1 + C\gamma \cdot H1^2);$ $Dy = Py \cdot (1 + C\alpha \cdot \sqrt{H1} + C\beta \cdot H1 + C\gamma \cdot H1^2);$ $H1 = \sqrt{(Px^2 + Py^2)};$ $Wx = \{-Dx/(M \cdot Lc)\} \cdot \{N - \sqrt{(N^2 - M \cdot Dx^2)} - M \cdot Lc)\};$ $Wz = \{N - \sqrt{(N^2 - M \cdot Dx^2)}\}/M;$ $M = 1 + (Dx^2/Lc^2);$ and $N = Rf + (Dx^2/Lc),$ wherein Fx and Fy represent an x-distance and a y-distance of said actual location of a pixel, Px and Py represent an x-distance and a y-distance of said ideal location of said pixel, Cα, Cβ, Cγ represent said correction parameters predetermined in accordance with the distortion of the taking lens, Rf represents a radius of curvature of the exposure frame at the exposure, and Lc represents a distance of a center of exit pupil of the taking lens to the intersection between the optical axis of the taking lens and the exposure frame, Rf and La being said correction parameters predetermined in accordance with the curvature of the exposure frame at the exposure.

10. An image data correction method as recited in claim 9, wherein said correction parameters Cα, Cβ, Cγ, Rf and Lc are experimentally predetermined according to the types of cameras, including lens-fitted photo film unit, stored in a memory in association with data of respective camera types, and read out from said memory in accordance with the camera type used for photographing the original image.

11. An image data correction method as recited in claim 10, wherein data of said correlation between said actual locations and said ideal location are written as a lookup table in a memory, and is revised with the change of the camera type used for photographing the original image.

12. An image data correction method as recited in claim 11, wherein said actual locations are calculated by use of said equations with respect to the first quadrant of said coordinate system, and are derived with respect to the second to fourth quadrant of said coordinate system from values "Fx" and "Fy" obtained with respect to the first quadrant.

13. An image data correction method as recited in claim 8, wherein said the image data of said respective pixels of the original image are written on a first image memory at memory locations corresponding to said actual locations, and are rearranged by being rewritten on a second image memory at memory locations corresponding to said ideal locations.

* * * * *